US010095692B2

(12) United States Patent
Song et al.

(10) Patent No.: US 10,095,692 B2
(45) Date of Patent: Oct. 9, 2018

(54) TEMPLATE BOOTSTRAPPING FOR DOMAIN-ADAPTABLE NATURAL LANGUAGE GENERATION

(71) Applicant: Thomson Reuters Global Resources, Baar (CH)

(72) Inventors: Dezhao Song, Eagan, MN (US); Blake Howald, Northfield, MN (US); Frank Schilder, Saint Paul, MN (US)

(73) Assignee: Thornson Reuters Global Resources Unlimited Company, Baar (CH)

( * ) Notice: Subject to any disclaimer, the term of this patent is extended or adjusted under 35 U.S.C. 154(b) by 29 days.

(21) Appl. No.: 14/726,119

(22) Filed: May 29, 2015

(65) Prior Publication Data

US 2015/0261745 A1    Sep. 17, 2015

Related U.S. Application Data

(63) Continuation-in-part of application No. 14/177,694, filed on Feb. 11, 2014, which is a continuation-in-part of application No. 13/689,194, filed on Nov. 29, 2012.

(60) Provisional application No. 62/082,362, filed on Nov. 20, 2014, provisional application No. 61/763,247, filed on Feb. 11, 2013.

(51) Int. Cl.
| G06F 17/27 | (2006.01) |
| G06F 17/28 | (2006.01) |
| G06F 17/20 | (2006.01) |
| G06F 17/30 | (2006.01) |
| G06F 17/00 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |

(Continued)

(52) U.S. Cl.
CPC ............................. G06F 17/2881 (2013.01)

(58) Field of Classification Search
CPC ............... G06F 17/2785; G06F 17/289; G06F 17/2872; G06F 17/30864; G06F 17/24; G06F 17/30011; G06F 9/4448; G10L 15/265; H04L 29/06; G06Q 10/10; G11B 27/034

See application file for complete search history.

(56) References Cited

U.S. PATENT DOCUMENTS 5,062,074 A * 10/1991 Kleinberger ........ G06F 17/3061
5,752,052 A *  5/1998 Richardson .......... G10L 15/193
                                                          704/9

(Continued)

OTHER PUBLICATIONS

Kondrak, "N-Gram Similarity and Distance" (Kondrak), p. 118, section 2.5, Nov. 2005.*

*Primary Examiner* — Anne L Thomas-Homescu
(74) *Attorney, Agent, or Firm* — Duncan Galloway Egan Greenwald, PLLC; Kevin T. Duncan

(57) ABSTRACT

The present invention relates to a system and method for bootstrapping templates for use in natural language sentence generation. More specifically, the present invention relates to identifying a set of candidate sentences from a large corpus based on a set of original templates by using a similarity measure. The set of candidate sentences are then processed or cleaned to generate a set of templates for use in natural language sentence generation.

20 Claims, 10 Drawing Sheets

(51) Int. Cl.
*G06F 15/177* (2006.01)
*G06F 15/16* (2006.01)

(56) References Cited

U.S. PATENT DOCUMENTS

| | | | | |
|---|---|---|---|---|
| 6,023,669 A * | 2/2000 | Suda | ............... | G06F 17/279 704/2 |
| 6,161,084 A * | 12/2000 | Messerly | ............. | G06F 17/30684 704/10 |
| 6,317,708 B1 * | 11/2001 | Witbrock | ............. | G06F 17/2715 704/9 |
| 7,149,347 B1 * | 12/2006 | Wnek | ............... | G06K 9/00469 382/159 |
| 7,333,927 B2 * | 2/2008 | Lee | ............... | G06F 17/2836 704/2 |
| 7,389,222 B1 * | 6/2008 | Langmead | ............. | G06F 17/2827 704/2 |
| 7,533,089 B2 * | 5/2009 | Pan | ............... | G06F 17/2785 704/9 |
| 7,561,734 B1 * | 7/2009 | Wnek | ............... | G06F 17/243 382/159 |
| 8,296,127 B2 * | 10/2012 | Marcu | ............... | G06F 17/2809 704/2 |
| 8,375,033 B2 * | 2/2013 | Shpigel | ............... | G06F 17/271 704/9 |
| 8,548,794 B2 * | 10/2013 | Koehn | ............... | G06F 17/2818 704/1 |
| 8,589,366 B1 * | 11/2013 | Younes | ............. | G06F 17/30864 707/602 |
| 8,650,031 B1 * | 2/2014 | Mamou | ............... | G10L 15/08 704/2 |
| 8,694,303 B2 * | 4/2014 | Hopkins | ............. | G06F 17/2818 704/2 |
| 8,775,155 B2 * | 7/2014 | Roth | ............... | G06F 17/2818 704/2 |
| 8,886,517 B2 * | 11/2014 | Soricut | ............. | G06F 17/2854 704/2 |
| 8,997,191 B1 * | 3/2015 | Stark | ............... | G06F 21/32 713/173 |
| 9,110,977 B1 * | 8/2015 | Pierre | ............... | G06F 17/30663 |
| 9,152,622 B2 * | 10/2015 | Marcu | ............... | G06F 17/2827 |
| 2003/0028564 A1 * | 2/2003 | Sanfilippo | ............. | G06F 17/30684 715/200 |
| 2003/0050924 A1 * | 3/2003 | Faybishenko | ..... | G06F 17/30867 |
| 2003/0149692 A1 * | 8/2003 | Mitchell | ............. | G06F 17/30684 |
| 2003/0195740 A1 * | 10/2003 | Tokuda | ............... | G10L 15/26 704/1 |
| 2004/0225651 A1 * | 11/2004 | Musgrove | ............. | G06Q 30/0253 |
| 2004/0249808 A1 * | 12/2004 | Azzam | ............... | G06F 17/30646 |
| 2005/0108266 A1 * | 5/2005 | Cao | ............... | G06F 17/2229 |
| 2006/0015324 A1 * | 1/2006 | Pan | ............... | G06F 17/2881 704/9 |
| 2006/0020886 A1 * | 1/2006 | Agrawal | ............. | G06F 17/248 715/256 |
| 2006/0178868 A1 * | 8/2006 | Billerey-Mosier | ............. | G06F 17/2881 704/9 |
| 2007/0061356 A1 * | 3/2007 | Zhang | ............... | G06F 17/30719 |
| 2007/0136246 A1 * | 6/2007 | Stenchikova | ......... | G06F 17/279 |
| 2007/0169021 A1 * | 7/2007 | Huynh | ............... | G06F 19/3487 717/136 |
| 2007/0219980 A1 * | 9/2007 | Songfack | ............. | G06F 17/30699 |
| 2007/0233488 A1 * | 10/2007 | Carus | ............... | G10L 15/183 704/257 |
| 2008/0133444 A1 * | 6/2008 | Gao | ............... | G06F 17/273 706/52 |
| 2008/0201132 A1 * | 8/2008 | Brown | ............... | G06F 17/30654 704/9 |
| 2008/0208567 A1 * | 8/2008 | Brockett | ............. | G06F 17/274 704/9 |
| 2008/0243481 A1 * | 10/2008 | Brants | ............... | G06F 17/2818 704/2 |
| 2009/0019013 A1 * | 1/2009 | Tareen | ............... | G06F 17/30722 |
| 2009/0077180 A1 * | 3/2009 | Flowers | ............. | G06F 17/30654 709/206 |
| 2009/0138258 A1 * | 5/2009 | Neale | ............... | G06F 17/2705 704/9 |
| 2009/0177460 A1 * | 7/2009 | Huang | ............... | G06F 17/2818 704/2 |
| 2009/0282019 A1 * | 11/2009 | Galitsky | ............. | G06F 17/30634 |
| 2009/0307213 A1 * | 12/2009 | Deng | ............... | G06F 17/30705 |
| 2010/0070262 A1 * | 3/2010 | Udupa | ............... | G06F 17/2735 704/7 |
| 2010/0100515 A1 * | 4/2010 | Bangalore | ............. | G06F 17/248 706/46 |
| 2010/0114867 A1 * | 5/2010 | Olston | ............... | G06F 17/30442 707/713 |
| 2010/0169352 A1 * | 7/2010 | Flowers | ............. | G06F 17/30864 707/759 |
| 2010/0198837 A1 * | 8/2010 | Wu | ............... | G06F 17/30672 707/748 |
| 2010/0312545 A1 * | 12/2010 | Sites | ............... | G06F 17/275 704/8 |
| 2011/0004606 A1 * | 1/2011 | Aumann | ............. | G06F 17/30675 707/759 |
| 2011/0087486 A1 * | 4/2011 | Schiller | ............. | G06Q 40/06 704/9 |
| 2011/0093254 A1 * | 4/2011 | Kuhn | ............... | G06F 17/2827 704/2 |
| 2011/0282643 A1 * | 11/2011 | Chatterjee | ............. | G06F 17/2818 704/2 |
| 2011/0282649 A1 * | 11/2011 | Waksberg | ............. | G06F 17/30893 704/8 |
| 2011/0301941 A1 * | 12/2011 | De Vocht | ............. | G06F 17/2715 704/9 |
| 2011/0320574 A1 * | 12/2011 | Felts | ............... | G06F 9/44505 709/220 |
| 2012/0101804 A1 * | 4/2012 | Roth | ............... | G06F 17/2818 704/2 |
| 2012/0203539 A1 * | 8/2012 | Axelrod | ............. | G06F 17/2809 704/2 |
| 2012/0226492 A1 * | 9/2012 | Tsuboi | ............. | G06F 17/30684 704/9 |
| 2012/0253793 A1 * | 10/2012 | Ghannam | ............. | G06F 17/2785 704/9 |
| 2012/0324350 A1 * | 12/2012 | Rosenblum | ............. | G06F 17/21 715/256 |
| 2013/0030793 A1 * | 1/2013 | Cai | ............... | G06F 17/28 704/9 |
| 2013/0054638 A1 * | 2/2013 | Kim | ............... | G06F 17/30616 707/769 |
| 2013/0097152 A1 * | 4/2013 | Sommer | ............. | G06F 17/30979 707/722 |
| 2013/0097166 A1 * | 4/2013 | Fink | ............... | G06Q 30/02 707/737 |
| 2013/0103388 A1 * | 4/2013 | Chen | ............... | G06F 17/30616 704/9 |
| 2013/0132364 A1 * | 5/2013 | Udupa | ............... | G06F 17/30663 707/709 |
| 2013/0151235 A1 * | 6/2013 | Och | ............... | G06F 17/27 704/9 |
| 2013/0174058 A1 * | 7/2013 | Kaul | ............... | G06F 3/0481 715/753 |
| 2013/0226846 A1 * | 8/2013 | Li | ............... | G06N 5/02 706/12 |
| 2013/0238329 A1 * | 9/2013 | Casella dos Santos | ............. | G06F 19/3487 704/235 |
| 2013/0246045 A1 * | 9/2013 | Ulanov | ............... | G06F 17/2775 704/9 |
| 2014/0012923 A1 * | 1/2014 | Caldwell | ............. | G06Q 10/107 709/206 |
| 2014/0019865 A1 * | 1/2014 | Shah | ............... | G06F 3/0484 715/731 |
| 2014/0100846 A1 * | 4/2014 | Haine | ............... | G06Q 10/067 704/9 |
| 2014/0149107 A1 * | 5/2014 | Schilder | ............. | G06F 17/2881 704/9 |

(56) References Cited

U.S. PATENT DOCUMENTS

| | | | |
|---|---|---|---|
| 2015/0161521 A1* | 6/2015 | Shah | G06F 17/278 706/12 |
| 2015/0293908 A1* | 10/2015 | Mathur | G06F 17/2818 704/2 |
| 2016/0012038 A1* | 1/2016 | Edwards | G06F 17/277 704/9 |

* cited by examiner

# TEMPLATE BOOTSTRAPPING FOR DOMAIN-ADAPTABLE NATURAL LANGUAGE GENERATION

RELATED APPLICATIONS

This application claims benefit of U.S. Provisional Application 62/082,362, filed Nov. 20, 2014, and is a continuation-in-part of U.S. patent application Ser. No. 14/177,694, filed Feb. 11, 2014, which claims benefit of U.S. Provisional Application Ser. No. 61/763,247, filed Feb. 11, 2013, and which is a continuation-in-part of U.S. patent application Ser. No. 13/689,194, filed Nov. 29, 2012, the contents of each of which are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2013 Thomson Reuters.

TECHNICAL FIELD

Various embodiments of the present invention concern systems and methods for natural language generation.

BACKGROUND

Natural language generation ("NLG") is a computer implemented processing task of generating natural language text. NLG can be thought of as a translator that converts a computer based representation into a natural language representation. There are various considerations to incorporate when trying to make computer generated text sound more "natural" such as what type of text is sought to be generated (communicative goal), what entities, events and relationships will express the content of that text, and how to forge grammatical constructions with the content into "natural" sounding text. These considerations are articulated in a variety of architectures. For example, Bateman and Zock (2003) summarize NLG as follows: (1) Macro Planning. determining how to structure a document (e.g., a document plan); (2) Micro Planning: determining how to phrase sentences within that document given a set of content (sentence and content planning); (3) Surface Realization: concatenating the information from (1-2) into coherent and grammatical text; and (4) Physical Presentation: document layout considerations (formatting, titles, etc.) (see Bateman and Zock (2003), "Natural Language Generation," In R. Mitkov (Ed.), Oxford Handbook of Computational Linguistics, Research in Computational Semantics, pp. 284-304. Oxford University Press, Oxford). Each one of these stages can have several subtasks and vary considerably in terms of complexity. There are several known NLG systems: rule-based, statistical and template-based. Known rule-based NLG systems utilize domain dependent rules (e.g., the weather domain) and manipulate different stores of data to generate "natural" sounding text. The rules exist at all levels of the known system from selecting content, to choosing a grammatical output to post-processing constraints to, for example, aggregating sentences, resolving pronouns and varying content. For example, if a rule-based system were created to generate weather forecasts from numerical data, the numerical data would need to be analyzed. In addition, decisions about what content to convey based on the analysis and how to grammatically represent the content at the sentence and document level are made and implemented by hand-crafted, domain dependent rules with input from multiple experts. While these known systems do not need an existing domain corpus to create the rules, the rules are heavily dependent on a given domain and require linguistic and domain expertise to develop the rules. In other words, a criticism of rule-based systems is that despite the generated texts tending to be of an objective high quality, there is intensive reliance on human investment.

Another known system is a statistical NLG system. Known statistical NLG systems look to bypass extensive rule construction by using corpus data to "learn" the set of rules. A known statistical NLG system creates alternative generations of natural language text from the statistical rules and then chooses which alternative at a given point in a generated discourse is governed by a decision model. For example, the pCRU system, which generates weather texts, starts with a small number of relations that are trained on a corpus. Alternatives are generated and then different probabilistic methods are used to generate the natural language text (see A. Belz (2007) "Probabilistic Generation of Weather Forecast Texts" In Proceedings of Human Language Technologies 2007: The Annual Conference of the North American Chapter of the Association for Computational Linguistics (NAACL-HLT'07), pp. 164-171). While known statistical NLG systems are less domain dependent and reduce the need for domain expertise, they do need training data and there is no guarantee that the natural language text is grammatically correct. Statistical systems have less of a reliance on human investment, but can be computationally expensive, depending on the type of decision model in place, and the output texts can be shorter and less natural.

A third known system is a template-based NLG system. A known template-based system creates a template where empty slots are replaced by specific information. For example, a template sentence may be "The temperature is <value>." The <value> is the empty slot where specific temperature information may be replaced. For known rule-based and statistical approaches, templates can be employed to structure the syntactic output. The use of templates avoids the need for extensive grammatical correction. The drawback is that templates from a known template-based system tend to be less interesting, less variable and less natural.

A central consideration in NLG is a concern for the adaptability of a given system to new domains. Significant human investments often need to be made to create systems from scratch. While these known systems may perform very well for a given domain, extending to alternative domains may require starting over. Statistical approaches, while streamlining some initial investment in human resources potentially falls prey to the same concern. A goal is to find an appropriate balance between how much pre-processing of data is required and how many rules are necessary relative to achieving an appropriate level of evaluated acceptance of the generated text.

A problem with existing NLG systems is that the process of generating a set of templates for use in generating NLG sentences is time consuming and inefficient. Existing NLG systems and methods utilize a manual process for generating a set of templates for use in the later generation of NLG sentences. While effective at generating NLG sentences, these templates require extensive human input and require a process that must be repeated for each new domain for NLG.

Accordingly, the inventors have recognized the necessity for additional improvements in the generation of sentence templates for use in natural language generation.

SUMMARY

The inventors propose a bootstrapping process for generating sentence templates for use in natural language sentence generation. A bootstrapping approach reduces the amount of human efforts needed to apply the NLG system to a new domain. At the same time, the bootstrapped templates enable a NLG system to produce documents that are of comparable quality to those generated by adopting human written templates. The bootstrapping process involves first receiving a set of original templates for use in identifying sentences to be used in generating a set of templates. A large corpus of documents is searched to identify a set of candidate sentences. Sentences may be included in the set of candidate sentences if they meet a similarity threshold with the set of original templates as determined by a similarity measure. The set of candidate sentences are then "cleaned" or modified to generate a set of templates for use in natural language sentence generation.

The bootstrapping method greatly reduces the amount of time necessary for implementing an NLG system in a new domain or subject area. By bootstrapping a set of sentence templates from a small set of original templates, a large body of sentence templates may be generated quickly and with a minimum of human intervention.

In a first embodiment, the present invention provides a computer implemented method comprising: a) receiving by a computer comprising a processor and a memory a set of original templates and storing the set of original templates in the memory; b) accessing by a computer a set of databases comprising a large corpus of documents and searching by a search engine the set of databases based on the set of original templates; c) identifying by the search engine a set of candidate sentences from a set of documents in the corpus by using a similarity measure to determine a similarity score; and d) processing the set of candidate sentences to generate a set of natural language generation templates.

The embodiment may further comprise sorting the set of candidate sentences based on the similarity score. The method may further comprise identifying all sentences in the corpus by splitting each sentence from each other sentence for every document in the corpus. The method may further comprise wherein the similarity measure comprises the formula:

$$\frac{|\text{gram\_set}(n, s1) \cap \text{gram\_set}(n, s2)|}{\min(|\text{gram\_set}(n, s1)|, |\text{gram\_set}(n, s2)|)} > \theta \quad (1)$$

wherein s1 represents a first sentence and s2 represents a second sentence and wherein gram_set(n, s1) and gram_set(n, s1) each extract the token level 1 to n-grams from a sentence. The identifying may further comprise identifying a set of syntactically similar sentences that are not identical to any template in the set of original templates and that comprise a set of semantic characteristics similar to the set of original templates. The method may further comprise determining if the similarity score for a sentence and a template from the set of original templates is higher than a determined threshold and placing the sentence in the set of candidate sentences. The identifying may further comprise identifying a set of candidate sentences that relate to a topic similar to a topic associated with the set of original templates. The method may further comprise wherein the set of original templates are manually generated for a domain. The large corpus of documents may be a news corpus. The method may further comprise generating by a computer a set of natural language sentences based on the set of natural language templates.

In another embodiment, the present invention provides a system for bootstrapping a set of templates for generating natural language sentences, the system comprising: a) at least one database comprising a corpus of documents; b) a computer comprising a processor and a memory, the memory containing a set of executable code executable by the processor; c) a search controller configured to receive a set of original templates and generate a query based on the set of original templates; d) a search engine adapted to receive the query from the search controller and search the corpus of documents using the query based on the set of original templates to identify a set of candidate sentences from the corpus of documents; e) a template analyzer adapted to: i) selecting a set of similar sentences from the identified set of candidate sentences by using a similarity measure to determine a similarity score for each selected sentence; and ii) generating a set of natural language generation templates based at least in part on the similarity scores.

The embodiment may further comprise wherein the template analyzer is further adapted to sort the set of candidate sentences based on the similarity score. The template analyzer may further be adapted to identify all sentences in the corpus by splitting each sentence from each other sentence for every document in the corpus. The similarity measure may comprise the formula:

$$\frac{|\text{gram\_set}(n, s1) \cap \text{gram\_set}(n, s2)|}{\min(|\text{gram\_set}(n, s1)|, |\text{gram\_set}(n, s2)|)} > \theta \quad (1)$$

wherein s1 represents a first sentence and s2 represents a second sentence and wherein gram_set(n, s1) and gram_set (n, s1) each extract the token level 1 to n-grams from a sentence. The search engine may further be adapted to identify a set of syntactically similar sentences that are not identical to any template in the set of original templates and that comprise a set of semantic characteristics similar to the set of original templates. The template analyzer may further be adapted to determine if the similarity score for a sentence and a template from the set of original templates is higher than a determined threshold and to place the sentence in the set of candidate sentences. The template analyzer may be adapted to identify a set of candidate sentences that relate to a topic similar to a topic associated with the set of original templates. The set of original templates may be manually generated for a domain. The large corpus of documents may be a news corpus. The template analyzer may further be adapted to generate a set of natural language sentences based on the set of natural language templates.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE EXEMPLARY EMBODIMENT(S)

Figure 1:
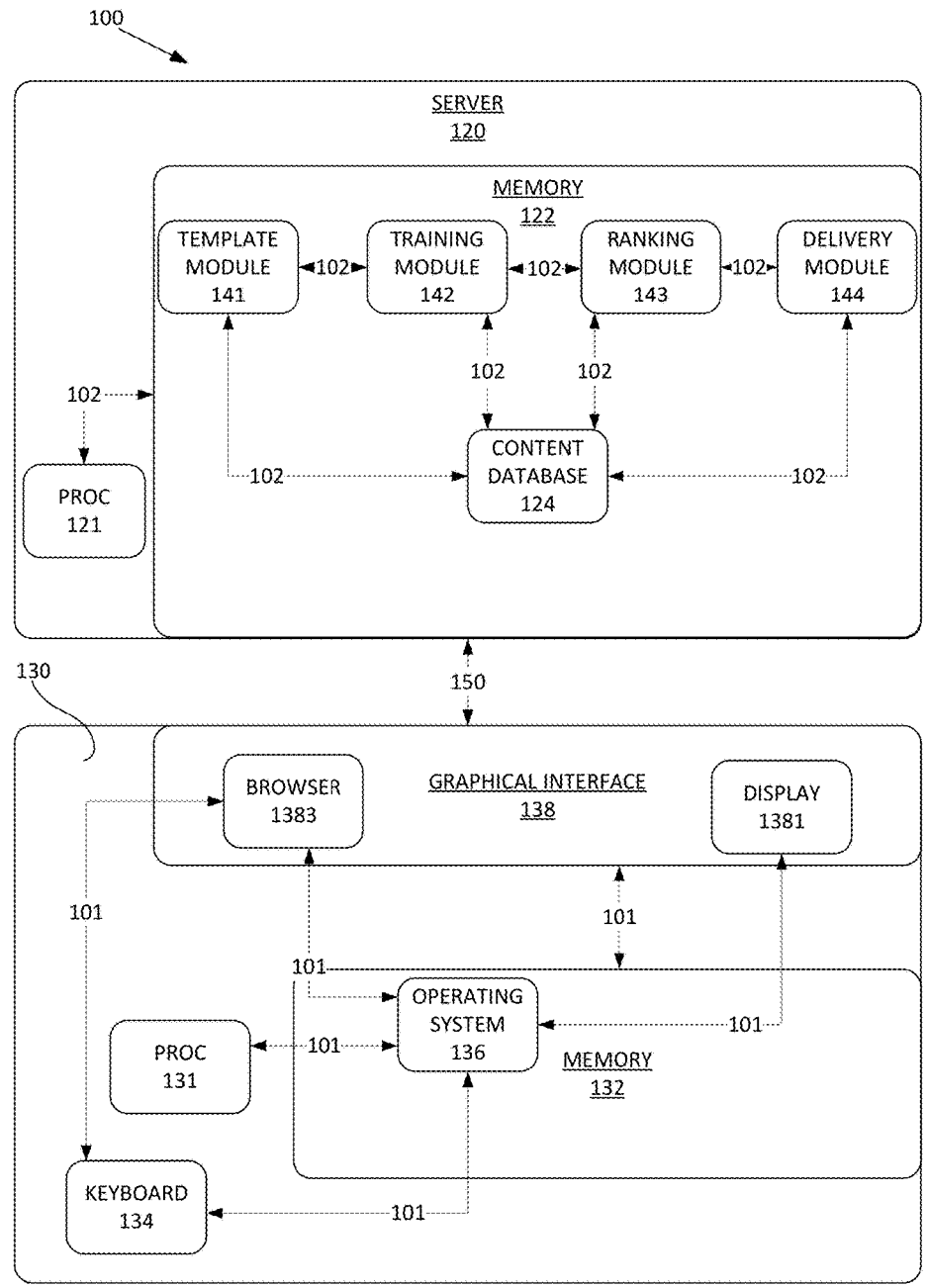
FIG. 1 is an exemplary system 100 which corresponds to one or more embodiments of the invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The description includes many terms with meanings derived from their usage in the art or from their use within the context of the description. However, as a further aid, the following definitions are presented. A corpus includes a set of pre-segmented texts. The corpus usually includes a set of documents wherein each documents has a set of pre-segmented texts. A pre-segmented text is a string of characters that has an implied beginning and end. For example, a sentence is a string of characters that has an implied beginning (a capital letter) and an end (a punctuation mark). Other exemplary pre-segmented texts may include one or more sentences, one or more paragraphs, a whole document and the like. Each pre-segmented text has at least one semantic term. A semantic term helps determine the conceptual meaning of the pre-segmented text. For instance, assume a pre-segmented text is a sentence. While each term within a sentence has a function, some terms are more helpful in capturing the conceptual meaning such as verbs, nouns, adjectives, adverbs and the like. The objective is to extract the set of semantic terms which are helpful in determining the conceptual meaning. A domain tag is a non-hierarchical term assigned/applied to a piece of information in a given domain. For example, if the domain is financial, a financial tag may be "value" wherein every sentence that has a financial value that number value is replaced with a <value> tag. There are also domain general tags as well. For instance, a domain general tag may be <company>, <person>, and <time>. Company, person and time tags are not necessarily specific to any type of domain. Exemplary domain tags are described throughout the specification (for instance, refer to steps 204 and 206). A modified pre-segmented text has fewer characters in the string than its corresponding pre-segmented text. Each modified pre-segmented text is created by extracting semantic terms and applying domain tags to a given pre-segmented text. Exemplary modified sentences are described throughout the specification (for instance, refer to step 204). A conceptual unit is a linguistic semantic cluster formed by combining all its characteristics or particulars. For instance, given a set of sentences from a weather domain, several conceptual units may be identified such as "warm front," "cold front," "daily temperature" and the like. The semantic terms within a sentence (e.g., a type of pre-segmented text) may be beneficial in determining what other sentences are like the given sentence to ultimately form a conceptual unit. A template is a semantic representation of a corresponding pre-segmented text and modified pre-segmented text. Exemplary templates are described throughout the specification (for instance, refer to step 206). A gold template is a chosen template, for a given iteration, to which a set of templates is compared.

Exemplary System

FIG. 1 shows an exemplary system 100, respectively, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to provide natural language text to access device 130. Server 120 includes a processor module 121 and a memory 122, wherein the memory 122 further includes a content database 124 and a program (not shown) with software modules 141, 142, 143 and 144. As shown in FIG. 1, in one embodiment, the software modules include a template module 141, a training module 142, a ranking module 143 and a delivery module 144. Details of the software modules 141, 142, 143 and 144 configured in memory 122 are discussed in further detail below. Processor module 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) within access device 130 and server 120, respectively. Processor module 121 may use computer bus 102 to queue a request that is to be transmitted through a signal, from server 120, via a wireless or wireline transmission channel 150 and is then ultimately received by the processor module 131 through the utilization of computer bus 101. Generally, server 120 transmits the signal via a wireless or wireline transmission channel 150 to at least one access device, such as access device 130.

Processor module 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores software modules 141, 142, 143 and 144 and a content database (DB) 124.

Content database 124 takes the exemplary form of one or more electronic, magnetic, and/or optical data-storage devices. Content database 124 includes a corpus of pre-segmented texts such as sentences, documents relating to the corpus, modified pre-segmented texts, semantic terms, domain tags, templates, calculations, and/or any other data needed to use system 100 and implement method 200 (see FIGS. 2 and 2A). The documents may be related to legal, financial, scientific, weather, biographical, tax and/or accounting information. The content and/or a subset of the content within the content database 124 may be subscriber content. Subscriber content includes content and related data for controlling, administering, and managing pay-as-you-go and/or subscription based access. For instance, a user may have to subscribe to a financial information retrieval service (e.g., Thomson One™) (not shown). The content is stored in the content database 124 and cannot be accessed until a set of user credentials are authenticated. For instance, user credentials may be a user name and associated password. Once the credentials are successfully authenticated on server 120, a delivery signal, associated with at least one updated authority record, is transmitted via the wireless or wireline transmission channel 150 to access device 130. For purposes described herein, successfully authenticating a set of user credentials means the user credentials were accepted by an authentication system (not shown but well known to those skilled in the art).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a personal computer which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines which one or more of the software modules 141, 142, 143 and 144 needs to be utilized, engages the given software module through the signal via a wireless or wireline transmission channel 150, accepts the software module output as data and stores that data temporarily in memory 132 (e.g., RAM). Operating system 136 and browser 1383 not only receive inputs from keyboard 134, but also supports rendering of graphical user interfaces within graphical interface 138.

Graphical interface 138 includes a browser 1383 and a display 1381. When one or more of the software modules 141, 142, 143 and 144 are initiated, a display 1381 is defined in memory 132 and rendered on graphical interface 138. Upon rendering, the graphical interface 138 presents the data/results in association with the set of instructions from the delivery module 144 as further discussed herein.

Exemplary Methods as Conducted by System 100

Figure 2:
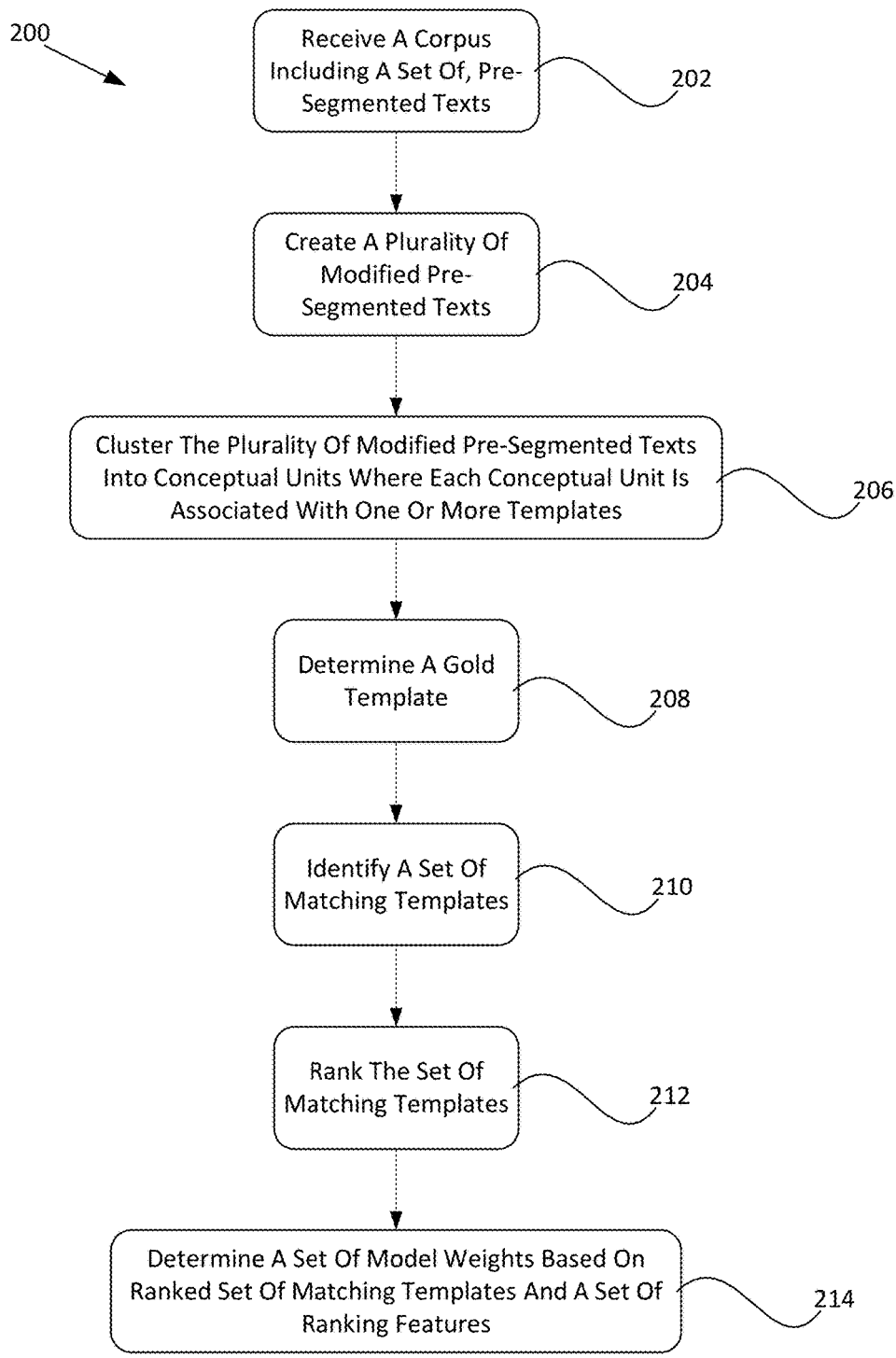
FIG. 2 outlines an exemplary method 200 which corresponds to one or more embodiments of the invention.
Figure 2A:
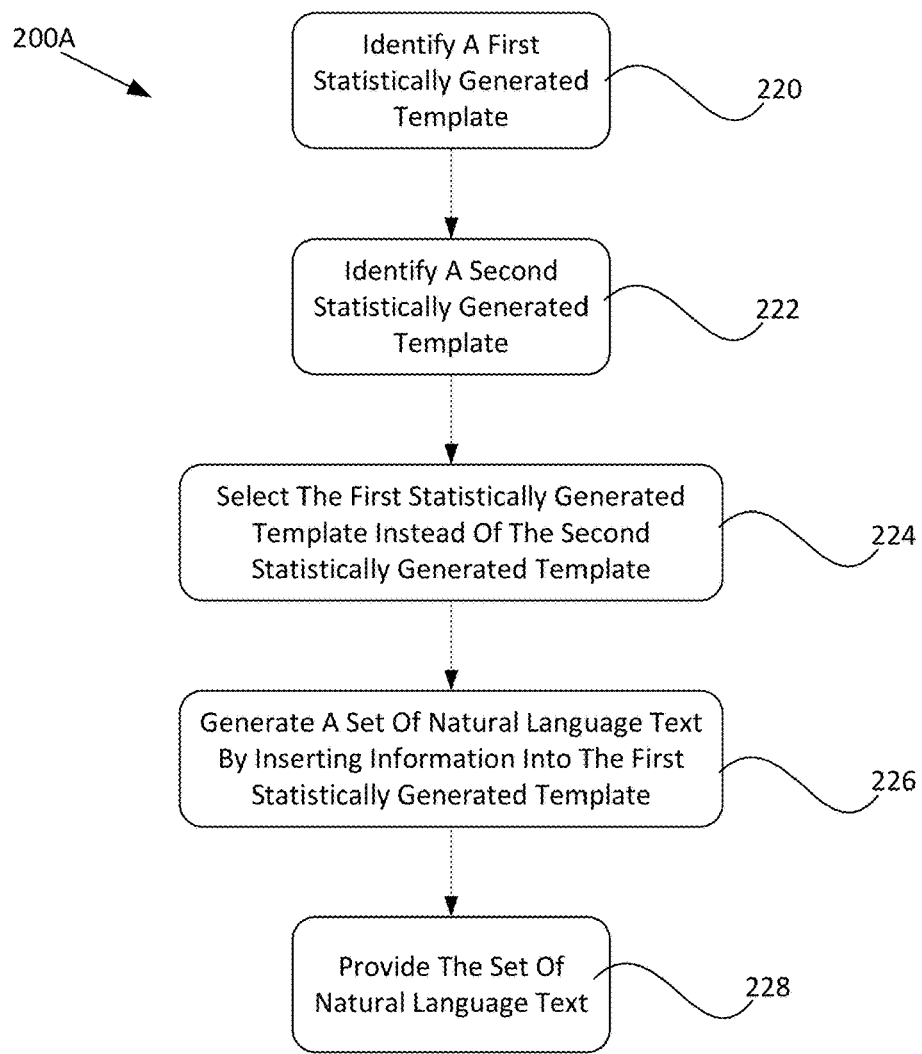
FIG. 2A outlines an exemplary method 200A which corresponds to one or more embodiments of the invention.

Referring now to FIGS. 2 and 2A, system 100 is configured to implement methods 200 and 200A. Methods 200 and 200A include functional blocks 202-214 and 220-228, respectively. These functional blocks are steps that perform actions including assignments, decisions, assessments and other like functions. In the following exemplary embodiments for methods 200 and 200A, an example of pre-segmented text is a sentence and a set of pre-segmented texts is a set of sentences. In addition, the domain unless otherwise specified is the financial domain.

In step 202, a corpus is received by the template module 141. A corpus includes a set of documents wherein each document has a set of sentences. The corpus and associated sentences are stored in content database 124. Once the corpus and corresponding sentences have been received and stored, the process moves to step 204.

In step 204, a plurality of modified sentences for the set of sentences is created using template module 141. In particular, creation of the modified sentences includes: 1) extracting a set of semantic terms for each sentence within the set of sentences and 2) applying at least one domain tag for each sentence within the set of sentences. To illustrate, consider the following exemplary sentences from a corpus within a financial domain:

1. The consensus recommendation for the financial services peergroup is a buy.
2. T. Rowe Price led the group last quarter with a 3.6% average per share price increase.
3. The increase is projected to level off during the current quarter.

The goal in creating a modified sentence is to provide a semantic representation of the original sentence. A semantic representation captures the conceptual meaning. While each term within a sentence has a function, some terms are more helpful in capturing the conceptual meaning such as verbs, nouns, adjectives, adverbs and the like. The objective is to extract the set of semantic terms which are helpful in determining the conceptual meaning. One skilled in the art recognizes that there are several methods to providing a semantic representation. For example, in one embodiment, discourse representation structure (DRS) provides an appropriate form for semantic representation. DRSs are formal semantic representations of sentences (and texts) that are a part of discourse representation theory (see H. Kamp and U.

Reyle (1993) "From Discourse to Logic An Introduction to Model Theoretic Semantics of Natural Language, Formal Logic and DRT" Kluwer, Dordrecht.). Discourse representation theory uses DRS to represent a hearer's mental representation of a discourse as it unfolds over time. There are two critical components to a DRS: 1) a set of discourse referents representing entities which are under discussion, and 2) a set of DRS conditions representing information that has been given about discourse referents. Consider the following sentence: "A farmer owns a donkey." The DRS of the sentence can be notated as [x,y: farmer(x), donkey(y), owns(x,y)]. What the DRS illustrates is two discourse referents, x and y, and three discourse conditions farmer, donkey, and owns, such that the condition farmer holds of x, donkey holds of y, and owns holds of the pair x and y. Informally, the DRS is true in a given model of evaluation if and only if there are entities in that model which satisfy the conditions. So, if a model contains two individuals, and one is a farmer, the other is a donkey, and the first owns the second, the DRS is true in that model. Subsequent sentences within the discourse may result in the existing DRS being updated. Consider subsequent sentence: "He chases it." Speaking the subsequent sentence after the first results in the DRS being updated as follows (assuming a way to disambiguate which pronoun refers to which individual): [x, y: farmer(x), donkey(y), own(x,y), chase(x,y)].

In a preferred embodiment, the method for providing a semantic representation may be to extract all terms from the given sentence except those identified in a list of stop terms. An exemplary list of stop terms may include terms such as "a," "the," "for," "is," "to," "with," "during," "per" and any numerical value. If any of these exemplary stop terms are present in a given sentence they are not extracted. Applying the above-mentioned stop terms to the exemplary sentences, the following stop word semantic representations are formed:

1. consensus-recommendation-service-financial-peer-group-buy
2. T.Rowe Price—group—lead—last—quarter—price—share—average—increase
3. increase-project-off-current-quarter In addition, during the formation of the semantic representation, at least one domain tag is applied for each sentence within the set of sentences. This application step is executed by the template module 141. A domain tag is a non-hierarchical term assigned to a piece of information in a given domain. For example, if the domain is financial, a financial tag may be "value" wherein every sentence that has a financial value that number value is replaced a <value> tag. The previous example is an example of a domain specific tag. There are also domain general tags as well. For instance, a domain general tag may be <company> or <time>. A time or company tag is not necessarily specific to any type of domain. Tagging a sentence allows for a more general semantic representation which becomes more helpful in the clustering step 206. Referring back to the stop term semantic representations, any domain specific tags are also being applied to sentences during the semantic representation formation. For example, the creation of a modified sentence for sentence (2) "T. Rowe Price led the group last quarter with a 3.6% average per share price increase." includes extracting semantic terms and applying domain general tags. The extracting and applying steps may be done in sequence or in parallel. Either way, the extracted semantic terms are: T.Rowe Price—group—lead—last—quarter—price—share—average—increase. However, when the domain general tags of <company> and <time> are applied, the semantic term T.Rowe Price is now tagged and replaced with the <company> tag and the terms "last" and "quarter" are tagged and replaced with the <time> tag. Since the word "last" describes "quarter," the <time> tag replaces both words. Therefore, the modified sentence for sentence (2) is <company>-group-lead-<time>-price-share-average-increase. This process is done for each sentence within the corpus. For instance, utilizing the extracting and applying steps to sentences (1) and (3), the plurality of modified sentences for sentences (1-3) is:

1. consensus-recommendation-service-financial-peer-group-buy
2. <company>-group—lead-<time>-price-share-average-increase
3. increase-project-off-<time>

The plurality of modified sentences may then be stored in content database 124. Once creation of the plurality of modified sentences is complete, the process advances to step 206.

In step 206, the plurality of modified sentences is clustered into one or more conceptual units by template module 141. Each of the one or more conceptual units is associated with one or more templates. In addition, each of the one or more templates corresponds to one of the plurality of modified sentences. In a preferred embodiment, the modified sentences are clustered using the k-means clustering technique. The k-means clustering technique is an unsupervised learning algorithm that classifies a given data set (e.g., a set of sentences) through a certain number of k clusters. The algorithm is composed of the following steps: 1) place k points into the space represented by the sentences that are being clustered (these points represent initial group centroids), 2) assign each sentence to the group that has the closest centroid, 3) when all of the sentences have been assigned, the positions of the k centroids are recalculated and 4) repeat steps 2 and 3 until the centroids no longer move. The k value is initially determined by an individual running the clustering technique. For instance, in the financial domain corpus, assume k is initially set to fifty (50) clusters. Using the k-means clustering algorithm provided above and given an exemplary set of sentences in the financial corpus, the algorithm outputs fifty (50) clusters. In some embodiments, the k clusters are manually checked to determined consistency (e.g., that all modified sentences assigned to a cluster convey the same or similar semantic concept). During the manual check, a determination may be made that some of the clusters should be combined. In some embodiments, an individual can combine the necessary clusters. For example, a determination may be made that 12 of the clusters should be combined. Therefore, there would be thirty-eight (38) clusters where each cluster represents a conceptual unit for the financial domain. In other embodiments, if the number of clusters using the initial k value is too large or small, then a different k value may have to be used. This trial and error process happens until an acceptable number of clusters is achieved.

Returning to the three modified sentences from the earlier example, if the k-means clustering is applied to those modified sentences, then a determination is made that each modified sentence belongs to a separate conceptual unit. This determination is memorialized by assigning a conceptual unit identifier to each modified sentence and corresponding original sentence. In some embodiments, a domain specific tag may also be applied to the original sentences after the clustering. For example, after clustering, the three previous modified sentences and their corresponding original sentences are assigned a conceptual unit identifier, {CuIDXXX}:

{CuID001} The consensus recommendation for the financial services peergroup is a buy;

{CuID001} consensus-recommendation-service-financial-peergroup—buy.

{CuID002} T. Rowe Price led the group last quarter with a 3.6% average per share price increase;

{CuID002}<company>-group-lead-<time>-price-share-average-increase.

{CuID003} The increase is projected to level off during the current quarter;

{CuID003} increase-project-off-<time>.

In addition, the domain specific tagging is applied, via template module 141, to the original sentences along with the domain general tags. The terms that the tags replace, however, is extracted and stored in content database 124. These extracted terms may be used for testing purposes later on. After the domain tags, both specific and general, are applied to each of the original sentences, the tagged original sentence is now considered a template. In addition, because each original and modified sentence has an assigned conceptual unit identifier, the templates can be grouped according to CuID. Therefore, each of the conceptual units is associated with one or more templates and each template corresponds to one of the set of sentences. Exemplary templates for the three sentences are:

a. {CuID001}: The consensus recommendation for the [industry] is a [recommendation].
b. {CuID002}: [company] led [industry] [time] with a [value] [financial] [movement].
c. {CuID003}: The [movement] is projected to level off during [time].

In some situations, there are duplicate templates within a given conceptual unit. In some embodiments, the duplicate templates are kept within the conceptual unit and stored in content database 124. In a preferred embodiment, the duplicate templates are removed so that only one template is representative. Therefore, a given template may be associated with one or more original sentences. Steps 202-206 are considered pre-processing steps. How to select a template from a given conceptual unit is determined relative to a ranking model. In order to develop a ranking model, the process continues to step 208.

Steps 208-214 describe the process needed to develop (e.g., train) a ranking model via training module 142. An exemplary ranking model uses a set of model weights to rank the templates within each conceptual unit. For example, if {CuID001} has twenty (20) templates, one needs to determine which template should be used. Ultimately, a ranking model has a determined set of model weights that are applied to each template. A score for each template is calculated and the templates are ranked according to their scores. However, before the ranking model can be used, the set of model weights needs to be determined. Steps 208-214 discuss how to determine those model weights.

In step 208, a gold template is determined by training module 142. For training purposes, each sentence within the corpus is considered. When a given sentence is chosen, it has a corresponding template and that corresponding template is the gold template for the given iteration. For example, assume there are five (5) documents, each document with ten (10) sentences. Therefore, there are fifty (50) sentences for the entire corpus. Training module 142 uses the first sentence of the first document and retrieves the corresponding template for that sentence in content database 124. That corresponding template then becomes the gold template for that iteration. In some embodiments where the templates have been de-duplicated, one or more sentences may have the same corresponding template. For instance, given that in the current example, there are fifty (50) sentences for the corpus, there will be fifty (50) iterations of gold templates even though some sentences have the same template. Even if some sentences have the same template, this information is beneficial during step 214. Once a gold template is determined by the training module 142, the process continues to step 210.

In step 210, a set of matching templates is identified, via training module 142, from the one or more templates within a given conceptual unit. The set of matching templates is associated with the gold template. For example, if the gold template is from {CuID001}, all of the potential matching templates come from the same conceptual unit identifier {CuID001}. In addition, the gold template has certain domain tags associated with it. The set of matching templates must not only be from the same conceptual unit, they must also have the exact same type and number of domain tags. For instance, if an assumption is made that the three templates below are part of the same CuID and the first one is the gold template, identification is needed as to whether the remaining two templates are matching templates to the given gold template.

a. GOLD: The consensus recommendation for the [industry] is a [recommendation].
b. TEMP1: [company] led [industry] [time] with a [value] [financial] [movement].
c. TEMP2: The [movement] is projected to level off during [time].

The gold template has two domain tags: <industry> tag and <recommendation> tag. Therefore, a comparison is done to see if the other templates have the exact same type and number of domain tags. TEMP1 has an <industry> tag. However, TEMP1 does not have a <recommendation> tag.

In addition, TEMP1 has additional tags that are not within the gold template. Therefore, TEMP1 is not a matching template. Applying that same logic, TEMP2 is also not a matching template although it has two domain tags, the type of domain tags are not the same. This process continues with a gold template and each template within the conceptual unit being assessed for whether or not the given template is a matching template to the gold. Once the set of matching templates is determined for a given gold template, the process moves to step 212.

In step 212, the set of matching templates are ranked by training module 142. The ranked set of matching templates is associated with the gold template. In a preferred embodiment, the matching templates for a given gold template are ranked using a Levenshtein distance from each matching template to the gold template (see V. Levenshtein (1966) "Binary codes capable of correcting deletions, insertions, and reversals" Soviet Physics Doklady 10, 707-710.). The Levenshtein distance between two strings (e.g., two templates) is defined as the minimum number of edits needed to transform one string into the other, with the allowable edit operations being insertion, deletion, or substitution of a single character. For example, the Levenshtein distance between "kitten" and "sitting" is three (3), since the following three (3) edits change one into the other, and there is no way to do it with fewer than three (3) edits:

1. kitten→sitten (substitution of 's' for 'k')
2. sitten→sittin (substitution of 'i' for 'e')
3. sittin→sitting (insertion of 'g' at the end)

Referring back to the matching templates and the gold template, the Levenshtein distance is calculated for each matching template against the given gold template. If the Levenshtein distance is low, the rank of the given matching template is high. For example, if the distance for three (3) matching templates is 4, 5, and 9, respectively then the matching template with a score of 4 is the first ranked template, the matching template with a score of 5 is the second ranked template and so on. One skilled in the art would appreciate that other methods may be used to accomplish a ranking score. After the set of matching templates for a given gold template is ranked, steps 208-212 may be reiterated for each sentence within a corpus. For example, if the entire corpus has fifty (50) sentences, there would be fifty (50) iterations of gold templates. Therefore, there would be fifty (50) iterations of steps 208-212. Each ranked set of matching templates along with the ranking scores may be stored in content database 124 for later retrieval.

In addition, the training module 142 calculates a set of ranking features for each matching template in the ranked set of matching templates. As explained above, since there may be more than one gold template, there may be more than one ranked set of matching templates. The set of ranking features is calculated for each ranked set of matching templates. A set of ranking features may include (1) position in text as a proportion of the total text, (2) type and number of domain tags, (3) n-grams, (4) template length and (5) domain tag overlap between current template and the gold template. A value for each feature is calculated for each sentence within the corpus via the training module 142. Each ranking feature calculation is discussed herein. The position feature determines where in a given document the given sentence corresponding to a given matching template is in relation to the whole text. For example, if the given ranked matching template corresponds to the fourth (4th) sentence within a document of ten (10) sentences, then the position value for the given sentence is (4/10)=0.4. The type and number of domain tags is a calculation of how many domain tags are in a given ranked matching template. For example, the ranked matching template may have two domain specific tags: <recommendation> and <industry> and two domain general tags: <company> and <company>. Since the <company> tag is indicated twice, the domain tag feature would indicate that there is one (1) recommendation, one (1) industry and two (2) company tags. The n-gram calculation determines how many combinations there are given the n-grams. For example, assuming the n-gram calculation was a 3-gram, the calculation would determine how many three (3) word consecutive combinations there are in the given matching template. For instance, the template "The consensus is <recommendation>." "The consensus is" is first three (3) word combination and "consensus is <recommendation>" is a second three (3) word combination. Therefore, the 3-gram calculation for the given sentence is 2. In some embodiments, the n-gram calculation may be one or more n-grams such as 1-gram, 2-gram, 3-gram, and the like. The template length feature is a word count for the corresponding template related to the given sentence. The content overlap calculation determines the overlap of words between the given gold template and the given sentence. To illustrate, below is one gold template and a matching template.
  a. GOLD: The consensus recommendation for the [industry] is a [recommendation].
  b. TEMP1: [recommendation] is the recommendation for the [industry].

One skilled in the art would appreciate that there are various ways to calculate content overlap. In some embodiments, the content overlap calculation is determined by the following equation:

$$\text{Content Overlap} = \frac{\text{\# Of Common Words Or Tags}}{\text{Minimum Template Length}}.$$

Applying that equation to the two templates above, there are seven (7) common words/tags (the, recommendation, for, the, [industry], is, [recommendation]). Since the two templates have different template lengths, the template with the minimum length is chosen. In this example, TEMP1 has the minimum template length with seven (7) words/tags. Now using those values for the equation:

$$\text{Content Overlap} = \frac{\text{\# Of Common Words Or Tags}}{\text{Minimum Template Length}} = \frac{7}{7} = 1$$

with # of common words=7 and minimum template length=7. Thus, the content overlap calculation for this example is 1. In other embodiments, the content overlap calculation is determined by the following equation:

$$\text{Content Overlap} = \frac{\text{\# Of Common Words Or Tags}}{(\text{Gold Template Length} + \text{Matching Template Length} - \text{\# Of Common Words or Tags})}.$$

With the # of common words=7, gold template length=9, and matching template length=7, the equation is:

$$\frac{\text{\# Of Common Words Or Tags}}{(\text{Gold Template Length} + \text{Matching Template Length} - \text{\# Of Common Words or Tags})} = \frac{7}{9} = 0.78.$$

While the second approach is a more fine grained, either content overlap calculation may be used as a ranking feature. Once each ranked matching template, from the one or more ranked sets of matching templates, has a set of ranking features calculated, the process progresses to step 214.

In step 214, the set of model weights are determined via the training module 142. The set of model weights are based on one or more ranked sets of matching templates and a set of ranking features. A ranking support vector machine (SVM) is used to determine a set of model weights.

The ranking SVM ingests the information regarding the ranked set of matching templates and the set of ranking features and determines the model weights that are best for the given ranking purpose. In some embodiments, the set of model weights are the weight values for each of the set of ranking features. For example, after the ranking SVM is used, some ranking features are weighted more/less than others based on the SVM calculations. Therefore, the model weights help determine which ranking features are more significant than others. Now knowing the set of model weights, a ranking model is developed through the training of gold templates and matching templates.

Once the ranking model is complete, it may be used to generate natural language text for a given domain. FIG. 2A illustrates steps for generating natural language text from a statistically generated template. In some embodiments, a statistically generated template may be generated by following steps 202-206. Since steps 202-206 are considered pre-processing steps, an assumption is made in method 200A that the statistically generated templates were already created and stored in content database 124 which in turn is stored in memory 122. Prior to commencing method 200A, a set of information associated with a record is received via ranking module 143 and stored in content database 124. A record is an information source relating to one or more domains. In particular, the record is associated with a set of information regarding one or more events and/or topics around a given domain. If the set of information includes more than one event/topic, one skilled in the art would appreciate that known techniques may be used to determine the beginning and/or end of the event/topic information.

For example, the information may already be tagged to indicate the different events/topics. In another example, an application may be used to indicate the different events/topics. The application can determine, for example, for every company name there is a corresponding buy/sell recommendation. Therefore, the application can tag each company/recommendation pair as a separate event within the record. In addition, the record may be transmitted, via a wireless or wireline transmission channel (not shown), from a given source (not shown). For example, a record may be created by a third party and/or internally and transmitted to system 100, in particular, ranking module 143. In staying with a financial domain example, an exemplary record is associated with a set of information regarding a buy/sell stock event of a company. The set of information includes a company name and a corresponding recommendation to buy/sell stock. This set of information may be tagged similarly to tagging techniques described earlier. For example, if the set of information is (Amazon; buy) a tag may be Amazon=<company> and buy=<recommendation>. The set of information may be tagged before or after being received by system 100, in particular ranking module 143, and processed by method 200A. Either way, method 200A must now generate a set of natural language text to articulate the set of exemplary information. Accordingly in steps 220 and 222, first and second statistically generated templates are identified, respectively, via the ranking module 143. Each of the first and second statistically generated templates should match a set of domain tags. For instance, in the previous example, the set of tagged information is Amazon=<company> and buy=<recommendation>. Steps 220 and 222 identify a first and second statistically generated template wherein each template has only the two domain tags of <company> and <recommendation>. In a preferred embodiment, a further filter is applied to narrow down the identification of the templates. This filter is a pre-determined conceptual unit. For example, if it is known that CuID012 exemplifies the concept that needs to be expressed, then the first and second statistically generated template may each be identified within CuID012 along with the two domain tags of <company> and <recommendation>. This further filter allows for more precise and accurate template identification if the conceptual unit is known. In addition, while the previous example refers to identifying a first and a second, in some embodiments, the identification of templates can be a plurality of templates beyond two. Once the identification of the first and second statistically generated template is complete, the process advances to step 224.

In step 224, the first statistically generated template is selected instead of the second statistically generated template. In order to evaluate the first and second templates, each of the templates is ranked according to the ranking model previously developed. Based on that ranking, a selection of templates occurs. In a preferred embodiment, the highest ranked template is selected. In other embodiments, a random selection of a ranked template may also occur. Either way, a template is selected and the process moves to step 226.

In step 226, a set of natural language text is generated via ranking module 143 and stored in content database 124. The generation of natural language text includes inserting a set of information associated with a record into the first statistically generated template. In step 224, a template is selected. Now the process takes the set of information received in the previous example and inserts that information into the template. For example, the following template is selected: "The consensus recommendation for [company] stock is a [recommendation]." The set of information given is Amazon=<company> and buy=<recommendation>. Therefore, by inserting the information into the template the following set of natural language text is generated: "The consensus recommendation for Amazon stock is a buy." After the information is inserted into the template to generate a set of natural language text, the process advances to step 228.

In step 228, the set of natural language text is provided via the delivery module 144. For example, the set of natural language text may be provided by the delivery module 144 and then sent to access device 130, through the wireless or wireline transmission channel 150, for a user to ultimately view. Using the previous example natural language text, the sentence, "The consensus recommendation for Amazon stock is a buy," is ultimately displayed to the user who can then digest and act upon the displayed information.

Domain Adaptability and Evaluation: Working Examples for Financial, Biography and Weather Domains As discussed previously, one of the benefits of the present invention is the domain adaptability. While most of the examples given previously were in the financial domain, this section discusses not only the financial domain but also the biography and weather domains. In addition, evaluations of these domains have been done and are included within this section.

Any domain of discourse can be reduced to an expression of semantics (e.g., a modified sentence). However, the key for NLG is to find a method that allows for the extraction of the appropriate level of semantics to be useable for generation. The level of semantics can be relatively course or fine grained and this must be weighed against a number of factors (e.g., the communicative goal and the selection of content). The selection of content is relatively fixed and is based on domain specific and general tagging. As explained previously the systems and method of the present invention were used to illustrate semantic term extraction and domain tagging application for clustering purposes to create templates for the following different training corpora: financial (4), biography (5) and weather (6).

(4) Financial Training Sentences
  a. The consensus recommendation for the financial services peergroup is a buy.
  b. T. Rowe Price led the group last quarter with a 3.6% average per share price increase.
  c. The increase is projected to level off during the current quarter.

Modified Sentences
- a. CONSENSUS—RECOMMENDATION—FINANCIAL—SERVICES—PEERGROUP—BUY
- b. <COMPANY>—LED—GROUP—<TIME>—AVERAGE—SHARE—PRICE—INCREASE
- c. INCREASE—PROJECTED—LEVEL—OFF—<TIME>

Conceptual Unit Assignment with Domain Tagging and Extraction
- a. {CuID001} Information: industry: financial services peergroup; recommendation: buy
- b. {CuID002} Information: company: T.Rowe Price; time: last quarter; value: 3.6%; industry: the group; financial: average per share price; movement: increase
- c. {CuID003} Information: movement: increase; time: the current quarter Templates
- a. {CuID001}: The consensus recommendation for the [industry] is a [recommendation].
- b. {CuID002}: [company] led [industry] [time] with a [value] [financial] [movement].
- c. {CuID003}: The [movement] is projected to level off during [time].

(5) Biography Training Sentences
- d. Mr. Mitsutaka Kambe has been serving as Managing Director of the 77 Bank, Ltd. Since Jun. 27, 2008.
- e. Earlier in his career, he was Director of Market Sales, Director of Fund Securities and Manager of Tokyo Branch in the Bank.
- f. He holds a Bachelor's in finance from USC and a MBA from UCLA.

Modified Sentences
- d. <PERSON>—SERVING—MANAGING—DIRECTOR—<COMPANY>—<DATE>
- e. EARLIER—CAREER—<PERSON>—DIRECTOR—MARKET—SALES DIRECTOR—FUND—SECURITIES—MANAGER—TOKYO—BRANCH—<COMPANY>
- f. <PERSON>—HOLDS—BACHELORS—FINANCE—USC—MBA—UCLA Conceptual Unit Assignment with Domain Tagging and Extraction
- d. {CuID004} Information: person: Mr. Mitsutaka Kambe; title: Managing Director; company: 77 Bank, Ltd.; date: Jun. 27, 2008
- e. {CuID005} Information: title: Director of Market Sales, Director of Fund Securities, Manager; organization: Tokyo Branch; company: the Bank
- f. {CuID006} Information: degree: Bachelor's, MBA; subject: finance; institution: USC; UCLA Templates
- d. {CuID004}: [person] has been serving as [title] of the [company] since [date].
- e. {CuID005}: Earlier in his career, [person] was [title], [title] and [title] of [organization] in [company].
- f. {CuID006}: [person] holds a [degree] in [subject] from [institution] and a [degree] from [institution].

(6) Weather Training Sentences
- g. Complex low from southern Norway will drift slowly nne to the Lofoten Islands by early tomorrow.
- h. A ridge will persist to the west of British Isles for Saturday with a series of weak fronts moving east across the north sea.
- i. A front will move ene across the northern North Sea Saturday.

Modified Sentences
- g. COMPLEX—LOW—SOUTHERN—<COUNTRY>—DRIFT—SLOWLY NNE—LOFOTEN—ISLANDS—<DATE>
- h. RIDGE—PERSIST—WEST—<COUNTRY>—<DATE>—SERIES—WEAK FRONTS—MOVING—EAST—NORTH—SEA
- i. FRONT—MOVE—ENE—NORTHERN—NORTH—SEA—DATE Conceptual Unit Assignment with Domain Tagging and Extraction
- g. {CuID007} Information: weather: complex low; direction: southern, nne; location: Norway, Lofoten Islands; date: tomorrow
- h. {CuID008} Information: weather: a ridge, a series of weak fronts; direction: west, east; organization: location: British Isles, North Sea; date: Saturday
- i. {CuID009} Information: weather: a front; direction: ene, northern; location: North Sea; date: Saturday Templates
- g. {CuID007}: [weather] from [direction] [location] will drift slowly [direction] to the [location] by early [date].
- h. {CuID008}: [weather] will persist to the [direction] of [location] for [date] with [weather] moving [direction] across [location].
- i. {CuID009}: [weather] will move [direction] across the [direction] [location] [date].

Three (3) subject-matter domains of discourse were evaluated: financial, biography and weather. As indicated in Table 1, the financial domain includes 1067 documents (with two (2) types of discourses (a) mutual fund reports (n=162), and (b) broker recommendations (n=905)) ranging from 1-21 sentences each. The biography domain includes 1150 documents ranging from 3-17 sentences each. The weather domain includes 1045 documents from the SumTime corpus which are created by experts for offshore oil rigs (see E. Reiter et al. (2005) "Choosing words in computer-generated weather forecasts" Artificial Intelligence 167, 137-169.).

TABLE 1

Data and Cluster Distribution

|  | Financial | Biography | Weather |
| --- | --- | --- | --- |
| Documents | 1067 | 1150 | 1045 |
| Conceptual Units (CU) | 38 | 19 | 9 |
| Templates | 1379 | 2836 | 2749 |
| Average Template/CU (Range) | 36 (6-230) | 236 (7-666) | 305 (6-800) |

For each domain, the corpus was processed, identified semantic terms were extracted (e.g., content words such as nouns, non-copular verbs, adjectives and adverbs) and domain general tags were applied (e.g., company, person and date) to create a plurality of modified sentences. Each modified sentence was grouped using k-means clustering with k set to fifty (50) for the financial domain and one hundred (100) for the biography and weather domains. The resulting clusters were manually checked to determined consistency (e.g., that all modified sentences assigned to a cluster conveyed the same or similar semantic concept). To this end, k was initialized to an arbitrarily large value to facilitate collapsing of similar clusters during error analysis. This was assumed an easier task than reassigning individual elements from existing clusters. As indicated in Table 1, this proved to be useful as the most semantically varied domain turned out to be the financial domain with thirty-eight (38) clusters (a cluster representing a "conceptual unit"). The biography and weather domains, despite being human generated, were semantically less interesting, nineteen (19) and nine (9) conceptual units, respectively. However, the biography and weather domains did exhibit significantly more variability with the average number of templates per conceptual unit being 236 and 305, respectively, as compared to thirty-eight (38) for the financial domain. That conclusion is somewhat expected given that the biography and weather domains are human generated, but focus on a narrow subject matter. Table 2 provides five (5) example clusters (e.g., a cluster may be considered a conceptual unit) from each domain.

Table 3 provides natural language text generation comparisons for the system (Sys), the random (Rand) and the original (Orig) text from each domain. The system is machine generated natural language text chosen by the systems and methods described earlier in the specification. The random is also machine generated natural language text chosen at random within a given conceptual unit (no model weights used). The original is the original natural language text from the given domain corpus. The variability of the generated natural language texts range from a close similarity to the original texts to slightly shorter, which is not

TABLE 2

| | Sample clusters via k-means clustering | | | | |
|---|---|---|---|---|---|
| Financial Clusters | 1 | 2 | 3 | 4 | 5 |
| Predicates | recommend consensus company strong buy | revision downward upward quarter week | analyst provide estimates time number | analyst week estimate high low | peer group recommend consensus time |
| Biography Clusters | 1 | 2 | 3 | 4 | 5 |
| Predicates | person position company join date | previous position company person served | resign position company date person | hold degree person from institution | previous company experience person date |
| Weather Clusters | 1 | 2 | 3 | 4 | 5 |
| Predicates | complex pressure low high movement | ridge pressure low high direction | front associated cold movement location | trough atlantic frontal direction location | pressure front high low location |

The result of the semantic preprocessing is a training corpus reduced to templates organized by conceptual unit. How to select a template from the semantic concept is determined relative to a ranking model.

The sentences from each domain were split into two groups-training and testing. The reason for the split is one group is used to train the ranking model and the other group to test the developed ranking model. The financial and biography documents were split roughly 70% of documents for training and 30% for testing (financial: 700/367; biography: 800/350; weather: 745/300). The training documents are represented as a series of conceptual units. A set of matching templates is identified from a given conceptual unit. Templates matching a set of domain tags are first retrieved from the conceptual unit's template bank (e.g., content database 124) and then ranked based on the Levenshtein distance from the gold template. The number of possible templates was restricted to twenty (20) to ease processing time. Additionally, a set of ranking features are associated with each ranked template. For example, a set of ranking features may include (1) position in text normalized as a proportion of the total text, (2) 1-3 grams and (3) template length. Weights are assigned to each feature based on the outcome of a ranking SVM.

In testing, each sentence of the testing document contains a conceptual unit and associated content. The templates in the conceptual unit are filtered based on the content (e.g., select only those templates that match the type of domain specific tagging present in the data), then model weights are assigned to each ranking feature in each template. The highest scored template is then selected for natural language text generation. The next section discusses the generated natural language texts and a series of automatic and human (crowd-sourced) evaluation tasks.

uncommon for NLG systems. The generated natural language text can be equally informative and semantically similar to the original texts (e.g., the financial natural language text in Table 3). The generated natural language text can also be less informative, but semantically similar to the original texts (e.g., leaving out "manager" in Biography Sys). However, there can be a fair amount of "gradient" semantic variation (e.g., moving northeast to a location vs. moving northeast across a location, Weather Sys, and Director of Sales Planning vs. Director of Sales, Biography Rand).

TABLE 3

| | Example Natural Language Text |
|---|---|
| System | Natural Language Text (Human or Machine Generated) |
| Financial Orig | Funds in Small-Cap Growth category increase for week. |
| Financial Sys | Small-Cap Growth funds increase for week. |
| Financial Rand | Small-Cap Growth category funds increase for week. |
| Weather Orig | Another weak cold front will move ne to cornwall by later friday. |
| WeatherSys | Another weak cold front will move ne to cornwall during friday. |
| Weather Rand | Another weak cold front from ne through the cornwall will remain slow moving. |
| Biography Orig | He previously served as Director of Sales Planning and Manager of Sendai Loan Center. |
| Biography Sys | He previously served as Director of Sales in Sendai Loan Center of the Company. |
| Biography Rand | He previously served as Director of Sales of the Company. |

Some semantic differences are introduced in the hybrid system despite generating grammatical sentences (e.g., "remain slow moving" (Weather Rand) is not indicated in the original text). These types of differences, which are clearly problematic for NLG systems, tend to occur most in the random rather than system generations. However, there are different levels of evaluation that inform the performance of an NLG system.

Figure 5:
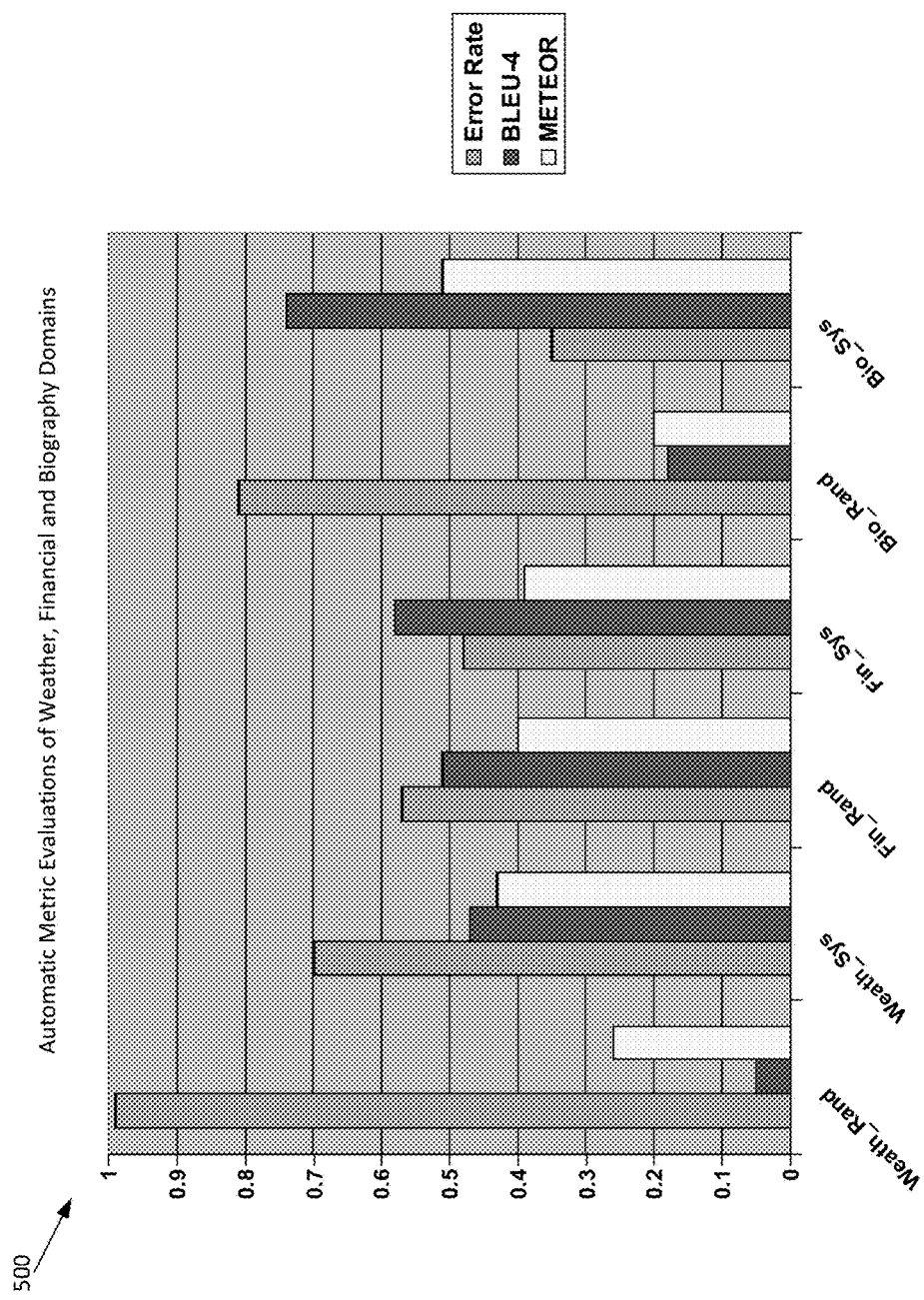
FIGS. 5-7 provide exemplary visual representations 500, 600, and 700 which correspond to the output of certain embodiments of the invention.

NLG systems are typically evaluated by automatic metrics, human metrics and the correlations between them. The human evaluations can (and, in some circumstances, should be) performed by both non-experts and experts. Non-expert evaluations are provided to determine grammatical, informative and semantic appropriateness. The automatic metrics such as Bilingual Evaluation Understudy (BLEU), Metric for Evaluation of Translation with Explicit Ordering (METEOR) and error rate originate from machine translation research. BLEU-4 measures the degree of 4-gram overlap between documents. METEOR uses a unigram weighted f-score minus a penalty based on chunking dissimilarity. Error rate is an exact match between strings of a document. Graph 500 in FIG. 5 provides the automatic evaluations of financial, biography and weather domains for both random and system for all of the testing documents in each domain (financial (367); weather (209); biography (350)).

For each domain, the general trend is that random exhibits a higher error rate and a lower BLEU-4 and METEOR scores as compared to system. This suggests that the system is more informative as compared to the original text. However, scores for the financial domain exhibit a smaller difference compared to the weather and biography domain. Further, the BLEU-4 and METEOR scores are very similar. This is arguably related to the fact that the average number of templates is significantly lower for the financial discourses than the weather and biography domain. That is to say, there is a greater chance of random system selecting the same template as system. In sum, from an automatic metric standpoint, filtering templates by content and applying model weights increases performance of the natural language text generation. However, human evaluations of the natural language text are necessary to confirm what the automatic metrics indicate.

Figure 6:
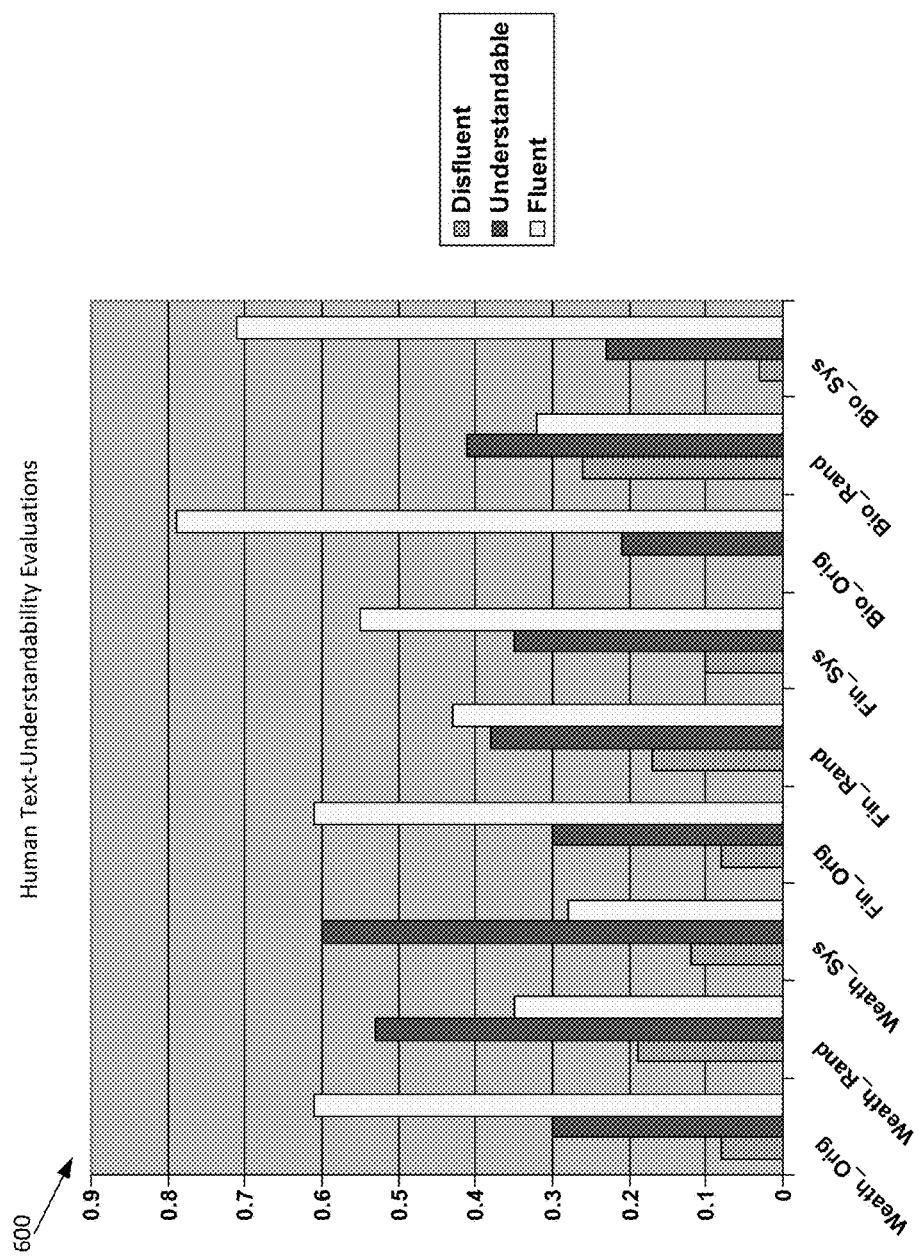
Figure 7:
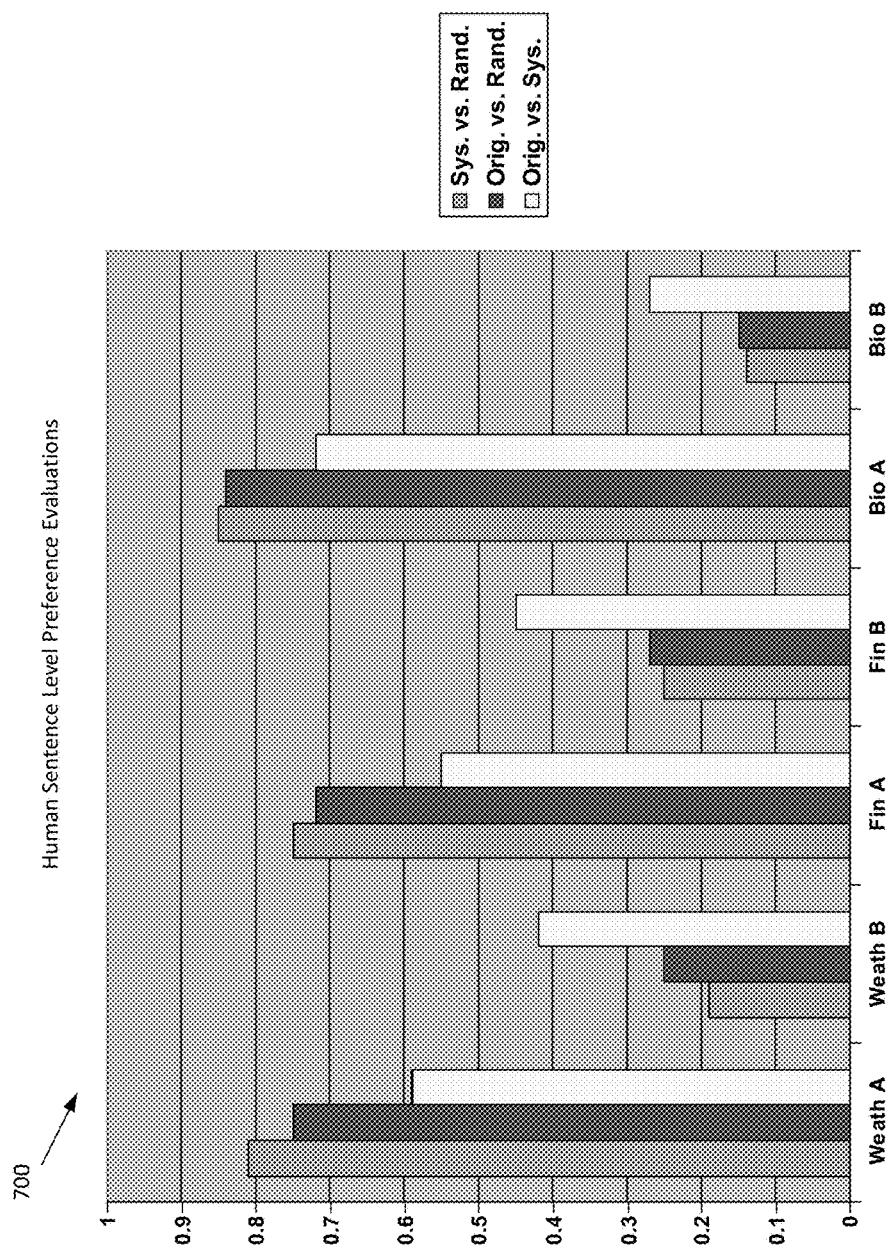

Two sets of crowd-sourced human evaluation experiments were constructed to compare against automatic metrics: (1) an understandability evaluation of the natural language text on a three-point scale: Fluent=no grammatical or informative barriers; Understandable=some grammatical or informative barriers; and Disfluent=significant grammatical or informative barriers; and (2) sentence level preference between two sets of texts (e.g., "Do you prefer Sentence A (from original) or the corresponding Sentence B (from random)"). One hundred (100) different texts and sentence pairs for system, random and original texts from each domain were used for the text understandability and sentence level preference evaluations. Graph 600 in FIG. 6 presents the human evaluations of the natural language texts. Graph 700 in FIG. 7 presents the sentence preference task. The aggregate percentage agreement for the natural language texts is 0.682 for understandability and 0.841 for the sentence level preference tasks.

In all cases, the original natural language texts in each domain demonstrate the highest comparative fluency and the lowest comparative disfluency. Further, the system texts demonstrate the highest fluency and the lowest disfluency compared to the random texts. However, the difference between the system and random for the financial and weather domains are close. Whereas, the difference between the system and random for the biography domain is much greater. This makes sense as the biography domain is human generated and, at their core, exhibit a high amount of variability. While the weather domain is also human generated and exhibits more variability compared to the financial domain, the weather domain reads more like the financial domain because of its narrow geographic and subject matter vernacular. Overall, however, this is a positive result for the hybrid approach and system.

Similar trends are demonstrated in the sentence preferences (see FIG. 7). In all cases, the original and system sentences are preferred to random. The original sentences are also preferred to system sentences, but the difference is very close for the financial and weather domains. This indicates that, at the sentence level, the system is performing similar to the original texts.

Extreme cases aside, there is no exact formula for translating automatic and human evaluations to a true estimation for how the generated natural language texts are performing. It is a relative determination at best and, in all actuality, deference is paid to the human evaluations. Human understandability of the natural language texts is key. As illustrated in Table 4, it is important to reconcile the human and automatic performance.

TABLE 4

Human-Automatic Pearson Correlation.

|  | ERROR RATE | BLEU-4 | METEOR | DIS-FLUENT | UNDER-STAND | FLUENT |
|---|---|---|---|---|---|---|
| ERROR RATE | 1 | −.976 | −.824 | .783 | .766 | −.914 |
| BLEU-4 |  | 1 | .921 | −.849 | −.626 | .841 |
| METEOR |  |  | 1 | −.960 | −.380 | .688 |
| DIS-FLUENT |  |  |  | 1 | .413 | −.751 |
| UNDER-STAND |  |  |  |  | 1 | −.910 |
| FLUENT |  |  |  |  |  | 1 |

Pearson correlation takes two unique values and determines if there is a correlation between them. For example, the error rate and BLEU-4 are two unique values. The Pearson correlation technique illustrates whether there is a correlation and if the two values are trending around the same rate. In the current example, the Pearson correlation value is −0.976. The negative indicates that the two values are trending in the opposite direction (e.g., one is increasing the other is decreasing). The overall Pearson correlation value 0.976 indicates a strong correlation between the two values. From Table 4, a few observations may be noted. The Pearson correlation between the automatic metrics is high with the appropriate direction (e.g., a high error rate should correlate negatively with a low BLEU or METEOR score). Fluent and Disfluent ratings also correlate well with automatic metrics—increased fluency corresponds to increased BLEU and METEOR scores and decreased error rate scores and vice-versa. The intermediate Understandable rating does not seem to correlate well and is potentially an artifact of the crowd-sourced task, i.e., the parameters of the Understandable category required more time to process, or humans prefer to choose more binary categories.

In summary, a hybrid statistical and template-based NLG system creates acceptable natural language texts for a number of different domains. From a resource standpoint, it is an attractive proposition to have a method to create NLG texts for a number of different subject matters with a minimal amount of development. The initial generation of the conceptual units and templates for the financial domain took two people one week. This was reduced to two days for the weather and biography domains. Most of the development time was spent on domain specific tagging and model creation. However, all told, only two person months were required. This investment is significantly lower than, for example, the SumTime corpus needed 12 person months for micro-planning and realization alone.

A Statistical NLG Framework for Aggregated Planning and Realization

A typical NLG system contains three main components: (1) Document (Macro) Planning—deciding what content should be realized in the output and also how the content is structured; (2) Sentence (Micro) planning—generating a detailed sentence specification and selecting appropriate referring expressions; and (3) Surface Realization—generating the final text after applying morphological modifications (see e.g., Bateman and Zock, 2003; Ehud Reiter and Robert Dale. 2000. Building Natural Language Generation Systems. Cambridge University Press; Kathleen R. McKeown. 1985. Text Generation: Using Discourse Strategies and Focus Constraints to Generate Natural Language Text, Cambridge University Press). However, Document Planning is arguably one of the most crucial components of an NLG system and is responsible for making the text have a more coherent structure. If a NLG system fails in the document planning stage, the communicative goal of the generated text will not be met even if the other two stages are perfect. While most traditional systems simplify development by using a pipelined approach where (1-3) are executed in a sequence, this can result in errors at one stage propagating to successive stages. The inventors propose a hybrid framework that combines (1-3) converting data to text in one single process.

Most NLG systems fall into two broad categories: knowledge-based and statistical. Knowledge-based systems heavily depend on having domain expertise to come up with handcrafted rules at each stage of a NLG pipeline. Although knowledge-based systems can produce high quality text, they are (1) very expensive to build, involving a lot of discussion with the end users of the system for the document planning stage alone; (2) have limited linguistic coverage, as it is time consuming to capture linguistic variation; and (3) one has to start from scratch for each new domain. Statistical systems, on the other hand, are fairly inexpensive, more adaptable and rely on having historical data for the given domain. Coverage is likely to be high if more historical data is available. Statistical systems are more prone to errors and the output text may not be coherent as there are less constraints on the generated text. Our framework is a hybrid of statistical and template-based systems. Many rule-based systems use templates to generate text. A template structure contains "gaps" that are filled to generate the output. Therefore, it is advantageous to create a lot of templates from the historical data and select the right template based on some constraints.

Typically, NLG systems are rule-based and, as mentioned above, have a pipelined architecture for the document and sentence planning stages and surface realization (Eduard H. Ho. 1993. Automated discourse generation using discourse structure relations. Artificial Intelligence, 63:341-385; Johanna D. Moore and Cecile L. Paris. 1993. Planning text for advisory dialogues: Capturing intentional and rhetorical information. Computational Linguistics, 19(4):651-694). However, document planning is arguably the most important task (Somayajulu Sripada, Ehud Reiter, Jim Hunter, and Jin Yu. 2001. A two-stage model for content determination. In Proceedings of the 8th European Workshop on Natural Language Generation (ENLG), pages 1-8). If follows that approaches to document planning are rule-based as well and, concomitantly, are usually domain specific. For example, Bouayad-Agha, et al. (2011) proposed document planning based on an ontology-based knowledge base to generate football summaries (Nadjet Bouayad-Agha, Gerard Casamayor, and Leo Wanner. 2011. Content selection from an ontology based knowledge base for the generation of football summaries. In Proceedings of the 13th European Workshop on Natural Language Generation (ENLG), pages 72-81).

Statistical approaches in general look to avoid extensive processing time by relying corpus data to "learn" rules for one or more components of an NLG system (Irene Langkilde and Kevin Knight. 1998. Generation that exploits corpus-based statistical knowledge. In Proceedings of the 36th Annual Meeting of the Association for Computational Linguistics (ACL'98), pages 704-710). For example, Duboue and McKeown (2003) proposed a statistical approach to extract content selection rules to generate biography descriptions (Pablo A. Duboue and Kathleen R. McKeown. 2003. Statistical acquisition of content selection rules for natural language generation. In Proceedings of the 2003 Conference on Empirical Methods for Natural Language Processing (EMNLP 2003). pages 2003-2007). Further, statistical approaches should be more adaptable to different domains than their rule-based counter-parts (Gabor Angeli, Percy Liang, and Dan Klein. 2012. A simple domain-independent probabilistic approach to generation. In Proceedings of the 2010 Conference on Empirical Methods for Natural Language Processing (EMNLP 2010), pages 502-512). For example, Barzilay and Lapata (2005) formulated content selection as a classification task to produce summaries of football games (Regina Barzilay and Mirella Lapata. 2005. Collective content selection for concept-to-text generation. In Proceedings of the 2005 Conference on Empirical Methods for Natural Language Processing (EMNLP 2005), pages 331-338). Kelly (2009) extended Barzilay and Lapata's approach for generating match reports for the game of cricket (Colin Kelly, Ann Copestake, and Nikiforos Karamanis. 2009. Investigating content selection for language generation using machine learning. In Proceedings of the 12th European Workshop on Natural Language Generation (ENLG), pages 130-137).

In order to generate text for a given domain, the system of the present invention runs the input data through a statistical ranking model to select a sequence of templates that best fit the input data. In order to build this model, our system runs the historical data (corpus) for the domain through four components: preprocessing, conceptual-unit creation, collecting statistics and building the ranking model. Each component is described herein.

The system is run on three different domains: financial, biography and weather. Within each domain there are one or more message types. The biography domain includes only one message type (of the same name) with 1150 human generated texts focused on corporate office biographies, ranging from 3-17 segments (period ended sentences). The financial domain includes 53 machine generated texts from a commercially available NLG system covering the message types of mutual fund performance reports. The weather domain includes a forecast message type with 1045 human generated weather reports for offshore oil rigs from the SUMTIMEMETEO corpus (Ehud Reiter, Somayajulu Sripada, Jim Hunter, and Jin Yu. 2005. Choosing words in computer-generated weather forecasts. Artificial Intelligence, 167:137-169).

Prior to the first step of the claimed method, the corpus is preprocesses to extract templates. It is assumed that each document in the corpus is classified to a message type from a given domain. Preprocessing involves uncovering the underlying semantic structure of the corpus and using this as a foundation (see e.g., (Wei Lu, Hwee Tou Ng, and Wee Sun Lee. 2009. Natural language generation with tree conditional random fields. In Proceedings of the 2009 Conference on Empirical Methods for Natural Language Processing (EMNLP 2009), pages 400-409; Wei Lu and Hwee Tou Ng. 2011. A probabilistic forest-to-string model for language generation from typed lambda calculus expressions. In Proceedings of the 2011 Conference on Empirical Methods for Natural Language Processing (EMNLP 2011), pages 1611-1622; Ioannis Konstas and Mirella Lapata. 2012. Concept to text generation via discriminative reranking. In Proceedings of the 50th Annual Meeting of the Association for Computational Linguistics, pages 369-378)).

Each document is split in the message type into sentences (based on period-ended sentences) and create a shallow Discourse Representation Structure (following Discourse Representation Theory (Hans Kamp and Uwe Reyle. 1993. From Discourse to Logic; An Introduction to Modeltheoretic Semantics of Natural Language, Formal Logic and DRT. Kluwer, Dordrecht)) of each sentence. The DRS consists of semantic predicates and domain general named entity tags (currently extracted from the Boxer semantic analyzer (Johan Bos. 2008. Wide-coverage semantic analysis with Boxer. In J. Bos and R. Delmonte, editors, Semantics in Text Processing. STEP 2008 Conference Proceedings, volume 1 of Research in Computational Semantics, pages 277-286. College Publications)). In parallel, domain specific named entity tags are identified and, in conjunction with the semantic representation, are used to create templates. For example, in (1), from the biography message type, the conceptual meaning of sentences (a-b) are represented in (c-d).

(1) Sentence
   a. Mr. Mitsutaka Kambe has been serving as Managing Director of the 77 Bank, Ltd. since Jun. 27, 2008.
   b. He holds a Bachelor's in finance from USC and a MBA from UCLA.
Conceptual Meaning
   c. SERVING|MANAGING|DIRECTOR|PERSON-|COMPANY|DATE
   d. HOLDS|BACHELOR|FINANCE|COMPANY|MBA|EVENT|COMPANY The outputs of the preprocessing stage are the template bank and predicate information for each sentence in the corpus. The next step is to create conceptual units for the corpus by clustering sentences. This is a semi-automatic process where we use the predicate information for each sentence to compute similarity between sentences. k-Means clustering is used with k set to an arbitrarily high value to over-generate (using the WEKA toolkit (Ian Witten and Eibe Frank. 2005. Data Mining: Practical Machine Learning Techniques with Java Implementation (2nd Ed.). Morgan Kaufmann, San Francisco, Calif.)). This provides for manual verification of the generated clusters which may be merged if necessary. A unique identifier is assigned called a CuId to each cluster, which represents a conceptual unit. Each template is associated in the corpus to a corresponding CuId by tracing the sentences in the clusters to the corresponding templates. For example, in (2), using the sentences in (1a-b), the identified named entities are assigned to a clustered CuId (2a-b) and then each sentence in the training corpus is reduced to a template (c-d).

(2) Content Mapping
   a. {CuId: 000}-Information: person: Mr. Mitsutaka Kambe; title: Managing Director; company: 77 Bank, Ltd.; date: Jun. 27, 2008;
   b. {CuId: 001}-Information: person: he; degree: Bachelor's, MBA; subject: finance; institution: USC; UCLA;
Templates
   c. {CuId: 000}: [person] has been serving as [title] of the [company] since [date];
   d. {CuId: 001}: [person] holds a [degree] in [subject] from [institution] and [degree] from [institution].

At this stage, there is a set of conceptual units with corresponding template collections. After identifying the different conceptual units and the template banks, a number of statistics by message type is collected, which will be used to build a ranking model in the next step:

Frequency distribution of templates: Count of unique templates divided by the total number of templates;

Frequency distribution of CuIds by position: Count of unique CuId/position combinations (e.g., CuId001p.1, CuId001p.4, etc.) divided by the total number of CuId/position combinations;

Frequency distribution of templates by position: Count of unique template/position combinations divided by the total number of template/position combinations;

Average number of entity tags by CuId: For all templates in a unique CuId, the number of unique entity tags divided by the total number of entity tags;

Average number of entity tags by CuId and position: For all templates in a unique CuId/position combination, the number of unique entity tags divided by the total number of entity tags;

Average number of words by CuId: For all of the words (not including entity tags) in all templates in a unique CuId, the total number of words divided by the total number of templates in a given CuId;

Average number of words by CuId and position: For all of the words (not including entity tags) in all templates in a given unique CuId/position combination, the total number of words divided by the total number of templates in a given CuId;

Frequency distributions of verbs by position: Count of unique verb/position combinations divided by the total number of verb/position combinations;

Frequency distribution of CuId sequence: Count of unique bigram and trigram sequences of CuIds divided by the total number of bigram and trigram sequences;

Frequency distribution of template sequence: Count of unique bigram and trigram sequences of templates divided by the total number of bigram and trigram sequences;

Frequency distribution of entity tag sequence: Count of unique entity tag sequences in all templates, divided by the total number of entity tag sequences;

Min, max and average number of CuIds by document: The average, minimum, maximum number of CuIds across all documents;

This will require tracing back each sentence in a document in the corpus to a template and then to a corresponding CuId.

The core component of system of the present invention is a statistical model that ranks a set of templates for the given position based on the input data and message type. The idea is to rank all the templates from all CuIds at each position. To generate the training data, the templates are first filtered that have named entity tags not specified in the input data. This will make sure the generated text is complete. Then templates are ranked according to the edit distance (Vladimir Levenshtein. 1966. Binary codes capable of correcting deletions, insertions, and reversals. Soviet Physics Doklady, 10:707-710) from the template corresponding the current sentence in the training document (focusing on the top 10 for ease of processing effort). For each template, the following features are generated to build the ranking model by message type:

CuId given position: This is a binary feature where the current CuId is either the same as the most frequent CuId for the position (1) or not (0);

Overlap of named entities: Number of common named entities between current CuId and most likely CuId for the position;

Prior template: Probability of the sequence of template selected at the previous position and the current template (iterated for the last three positions);

Prior CuId: Probability of the sequence of the CuId selected at the previous position and the current CuId (iterated for the last three positions);

Difference in number of words: Absolute difference between number of words for current template and average number of words for CuId;

Difference in number of words given position: Absolute difference between number of words for current template and average number of words for CuId at given position;

Percentage of unused data: This feature represents the portion of the unused input so far;

Difference in number of named entities: Absolute difference between the number of named entities in the current template and the average number of named entities for the current position;

Most frequent verb for the position: This is a binary valued feature where the main verb of the template belongs to the most frequent verb group given the position is either the same (1) or not (0);

Average number of words used: Ratio of number of words in the generated text so far to the average number of words;

Average number of entities per message type: Ratio of number of named entities in the generated text so far to the average number of named entities;

Most likely CuId given position and previous CuId: This is a binary feature indicating if the current CuId is most likely given the position and the previous CuId;

Difference between the most likely template in CuId and current template: Edit distance between the current template and the most likely template for the current CuId;

Difference between the most likely template in CuId given position and current template: Edit distance between the current template and the most likely template for the current CuId at the current position.

A linear kernel is used for a ranking SVM (Thorsten Joachims. 2002. Learning to Classify Text Using Support Vector Machines. Kluwer) (with cost set to the total number of queries) to learn the weights associated with each feature for the different message types (biographies=2534; weather=1969; financial=9856).

The first step of the claimed method is generating or creating based on a current set of input, a first automated natural language sentence.

At generation time, the system of the present invention has a set of input data, a semantically organized template (also known as statistically generated template) bank and a model from training on the documents for a given message type. To generate the initial sentence, those templates that contain a named entity tag not present in the input data are filtered out. Then, the feature values are calculated (multiplied by that feature's weight from the model) for each of the remaining templates. The template with the highest overall score is selected and filled with matching entity tags (also known as one or more input pieces) from the input data and appended to the generated text. This exemplary process 300A is outlined in FIG. 3A. The next step is to remove at least one of the one or more input pieces from the current set of input to form a modified current set of input. This modified current set of input comprises of at least one less input piece than the current set of input.

Before generating the next sentence, the entities used in the initial sentence generation are monitored and the decision is made to either remove those entities from the input data or keep the entity for one or more additional sentence generations. For example, in financial discourses, the name of the company may occur only once in the input data. However, it may be useful for creating good texts to have that company name available for subsequent generations. To illustrate, in (3) if we remove Ford from the input data after the initial generation, (c) becomes difficult to resolve as it indicates an increase in stock price after indicating that the car manufacturers peer group saw a decrease in performance. If "Ford" is not removed, then the generations in (d-f) are more cohesive.

(3) Use Once and Remove
   a. Ford posted stronger than expected earnings for the fourth quarter.
   b. The car manufacturers peer group saw decreased performance overall.
   c. Average stock price moved from 23.56 per share to 24.75 per share.
Use More than Once
   d. Ford posted stronger than expected earnings for the fourth quarter.
   e. The car manufacturers peer group saw decreased performance overall.
   f. Ford's average stock price moved from 23.56 per share to 24.75 per share.

Deciding on what type of entities and how to remove them is different for each message type. For example, some entities are very unique to a text and should not be made available for subsequent generations as doing so would lead to unwanted redundancies (e.g., stating the monthly performance of a mutual fund more than once) and, as in (3), some entities are general and should be retained. The system of the present invention possesses the ability to monitor the data usage and we can set parameters on the usage to ensure coherent generations for a given message type.

The inventors also rely on this process to generate referential expressions such as pronouns and demonstratives, which could be tagged in the training data (e.g., he getting a PERSON tag or the company a COMPANY tag). However, this is not an elegant solution as the same would not exist in the input data. Consequently, once entities that are eligible to have a co-referential word or phrase are used (e.g., companies and persons), the entity can be replaced in the input data with a referring expression and retained in the input data. Doing this would then return "The company's average stock price moved from 23.56 per share to 24.75 per share." for sentence (3f).

Figure 3:
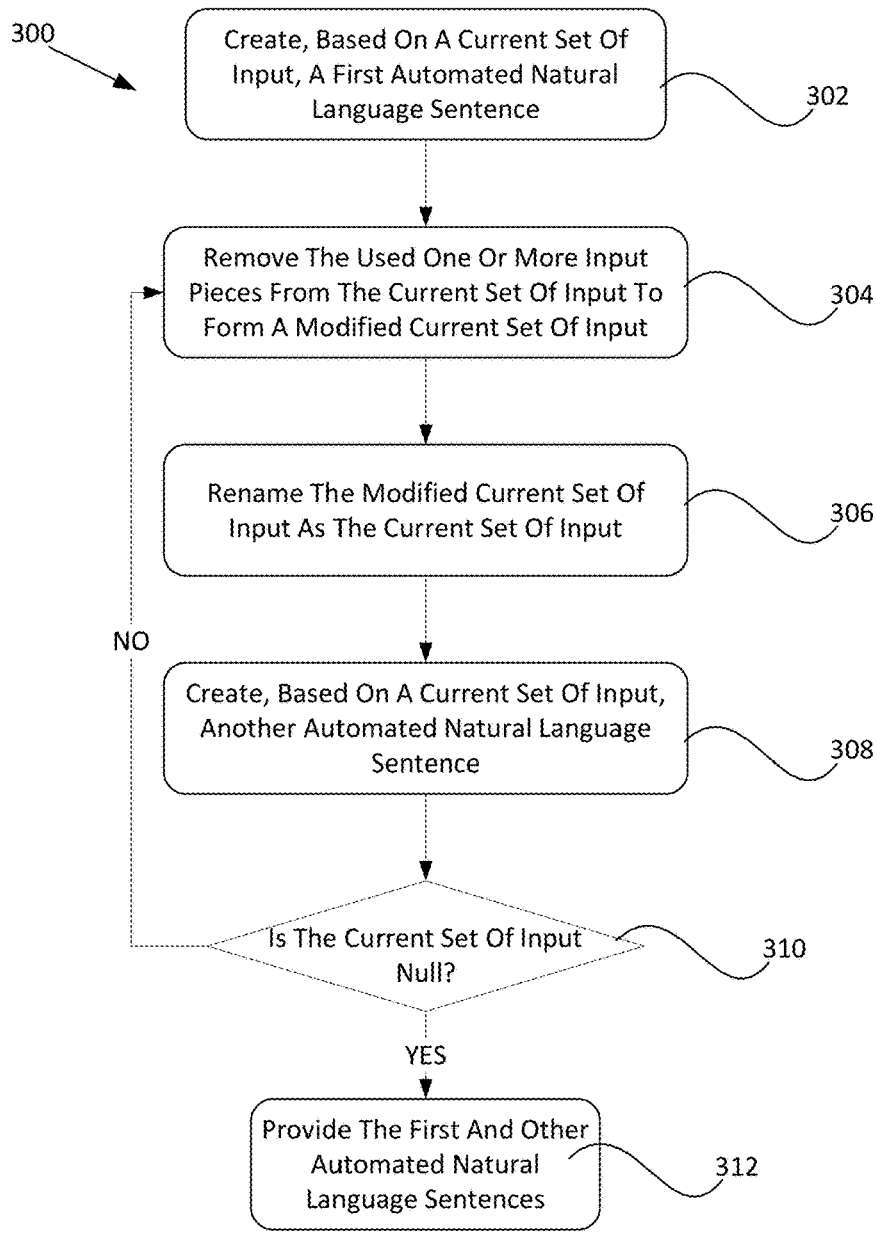
FIGS. 3-4 outline exemplary methods 300, 300A and 400 which correspond to one or more embodiments of automated multiple sentence generation.
Figure 3A:
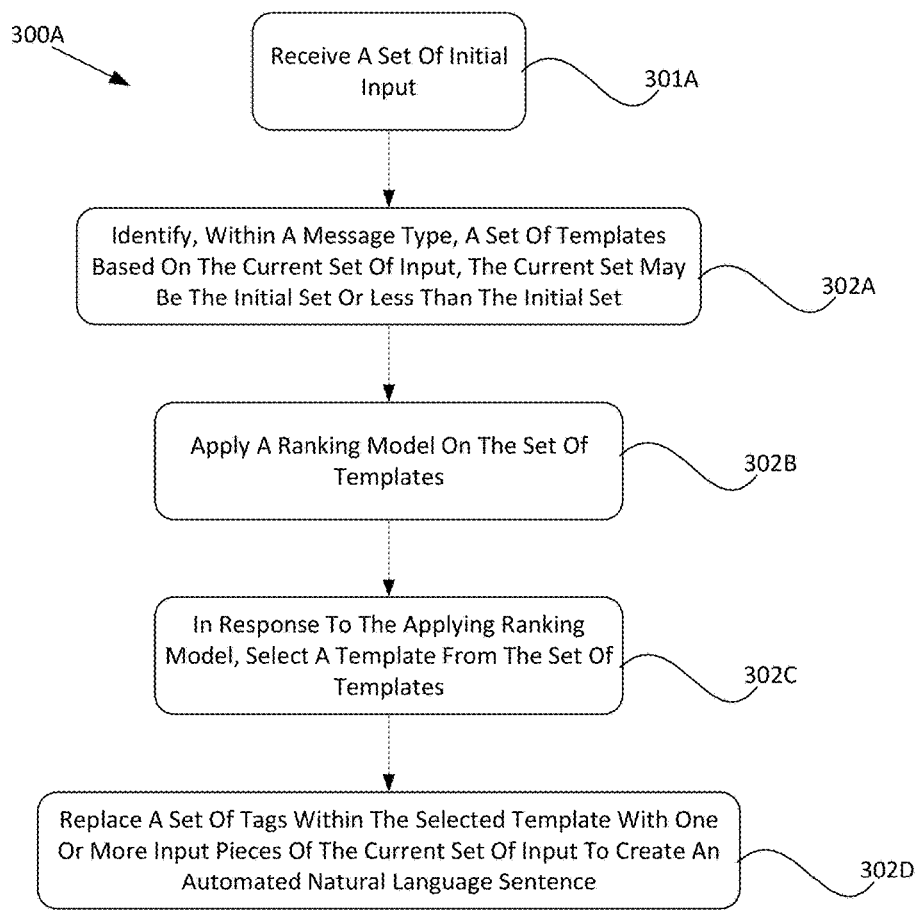
Figure 4:
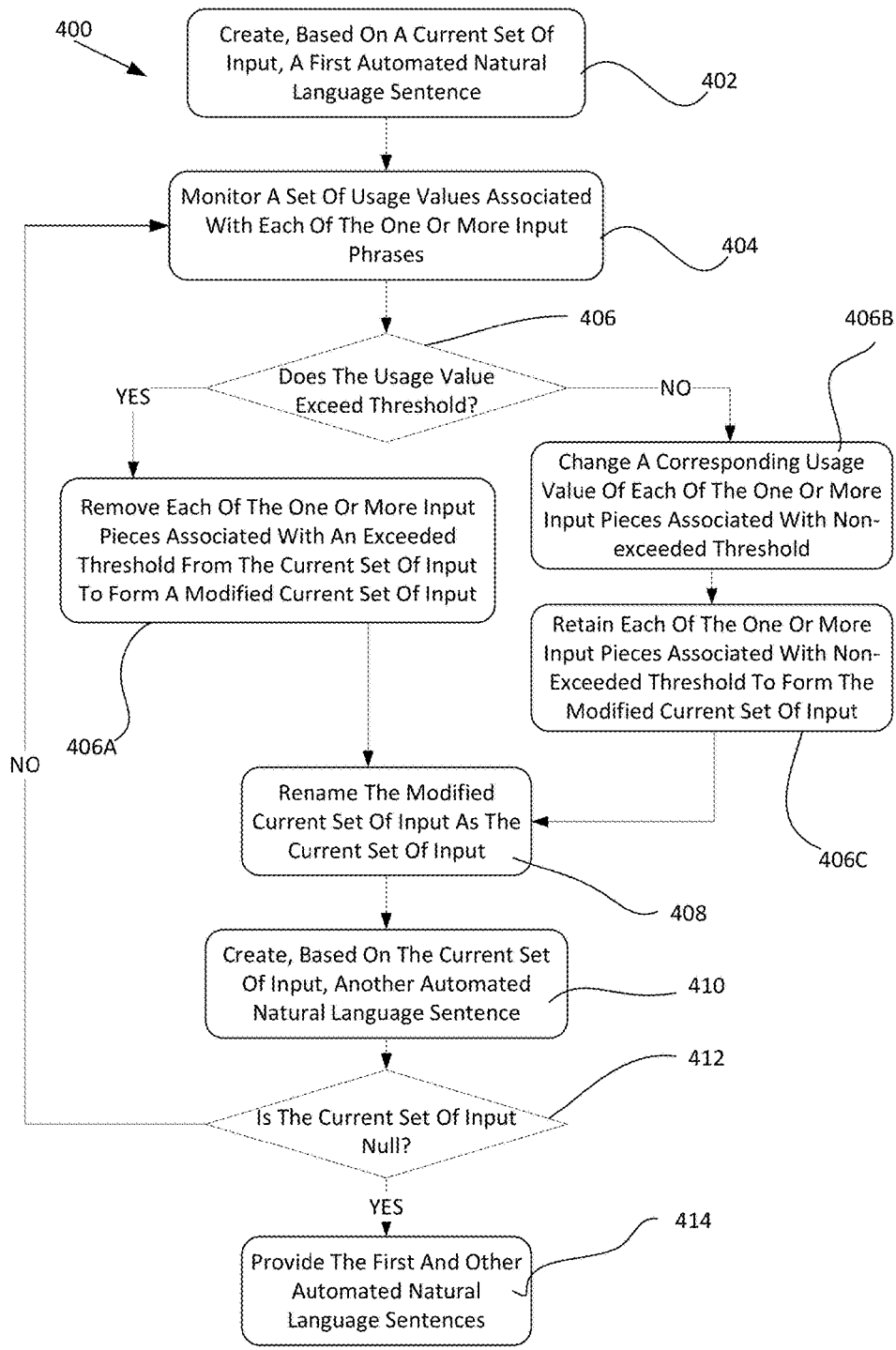

Once the input data has been modified (i.e., an entities have been removed, replaced or retained), it serves as the new input data for the next sentence generation. This process then iterates until the predetermined minimum number of sentences is reached (determined from the training corpus statistic) and then continuing until all of the remaining input data is consumed (and not to exceed the predetermined maximum number of sentences, also determined from the training corpus statistic). FIG. 3 illustrates the exemplary method 300 of only removing one or more input pieces to ultimately provide one or more automated natural language sentences. FIG. 4 illustrates the exemplary method 400 of monitoring the usage values of each of the one or more input pieces and if the usage value exceeds a threshold, then remove the one or more input pieces to form a modified current set of input or if the usage value does not exceed the threshold, then retain the input pieces and change the usage value to ultimately provide one or more automated natural language sentences. Either way the aforementioned paragraphs disclose features and functionality of exemplary methods 300A, 300 and 400.

The method concludes with providing the first automated natural language sentence and the second automated natural language sentence.

Template Bootstrapping

The systems and methods discussed hereinabove for generating natural language sentences require some degree of human input or effort to apply the NLG system to a new domain. A bootstrapping approach reduces the amount of human efforts needed to apply the NLG system to a new domain. At the same time, the bootstrapped templates enable a NLG system to produce documents that are of comparable quality to those generated by adopting human written templates.

Figure 8:
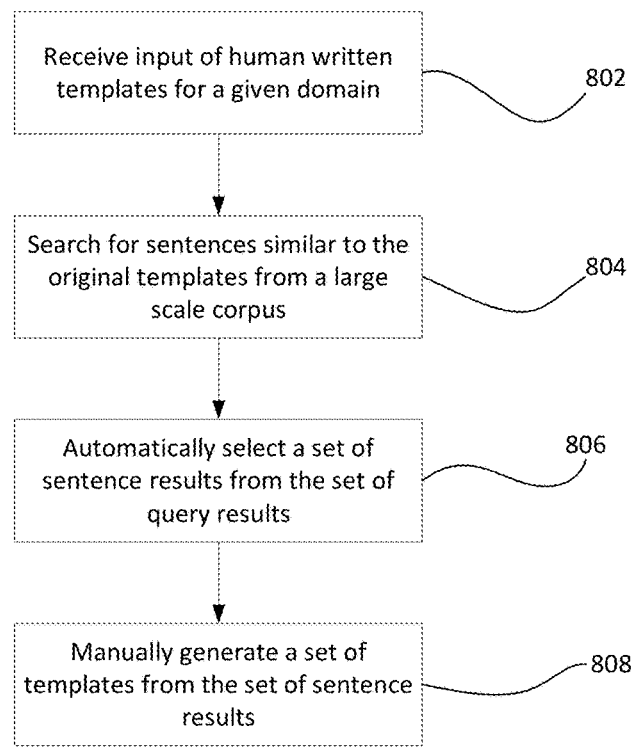
FIG. 8 provides an exemplary method 800 which corresponds to a method of generating template sentences according to the present invention.

With reference now to FIG. 8, a method 800 of generating a set of templates to be used in a NLG process is provided. First, at step 802, in order to be able to bootstrap the template generation process, a set of human manually prepared or constructed templates (original templates) for a given domain are required. Given an original template t original (a template that was manually created), the t original template is tokenized and then token-level 1 to n grams are extracted from it (i.e., unigrams, bigrams, tri-grams, etc). All these extracted token-level n-grams are put into a set that does not contain any duplicate token level n-grams. These steps are required for preparing an original token-based template. The system may also perform the same preparation on all sentences (S) from the large corpus. With these original templates, at step 804 a search is performed, such as by a text-search engine, against a corpus of documents to identify sentences that are similar to the original templates from a large-scale corpus. Also at step 804 a similarity between t original and each sentence (s) in S is computed to determine if S should be a candidate sentence for t original as detailed in step 806. Equation 1, provided hereinabove, may be used to compute the similarity. At step 806, a set of automatically selected sentences is identified from the set of search results, and at step 808 the templates to be utilized by the NLG system are manually generated. The bootstrapping algorithm for template generation includes a sentence retrieval process, a large-scale corpus used in identifying template sentences and a manual sentence refining process to covert the automatically selected sentences to templates.

Finding Similar Sentences

The bootstrapping process starts by receiving a set of high-quality human written templates as an initial input. The human written templates may be obtained from domain experts, template libraries, or from other suitable sources. These original templates are used to identify sentences that are syntactically similar to the original templates from a large corpus. The search method identifies sentences that are similar to the original templates to make sure the generated templates from these automatically selected sentences are discussing the same or similar topics as the original templates. For example, if the original template is describing the employment information of a person, the search and identification process should not select sentences relating to a person's hobbies.

The search method also identifies sentences that are not identical to the original templates to obtain a diverse set of templates. For example, in the mutual fund domain, financial analysts may describe the performance of a fund using the following original template:

"Fund A's performance increased B percent in the past week."

Using this original template, a sentence that may be returned in the set of search results as a sentence to be used for template generation may be:

"Last week, Fund A jumped B percent."

The second sentence describes the same core information, i.e., Fund A has had better performance. Also, the second sentence is represented in a way that is linguistically different from the original sentence. The second sentence uses a different verb and has an additional clause at the beginning. Using the bootstrapping approach of the present invention, the search function is able to identify sentences (and therefore provide for the manual generation of templates) that are syntactically different but bear the same semantic characteristics.

To identify sentences that are both similar to the original templates and not identical to the original templates, the following similarity measure may be used:

$$\frac{|\text{gram\_set}(n, s1) \cap \text{gram\_set}(n, s2)|}{\min(|\text{gram\_set}(n, s1)|, |\text{gram\_set}(n, s2)|)} > \theta \qquad \text{Equation 1}$$

In this similarity measure, s1 and s2 represent two sentences, and gram_set(n, s1) extracts the token level 1 to n-grams from a sentence, i.e., unigram, bigram, trigram, . . . , n-gram. Using this similarity measure, syntactically similar sentences may be identified by examining the n-grams while simultaneously reducing the number of candidate sentences by setting an appropriate threshold. In the present invention, one of the two sentences is the original template and the other one is a sentence identified from the large corpus. If the calculated similarity between the original sentence and the identified sentence is higher than the threshold, the sentence in the corpus is treated as a candidate, i.e., a candidate sentence that may potentially be refined to generate a useful template.

A known similarity measure is the Jaccaard similarity measure (P. Jaccard (1901), "Distribution de la Flore Alpine dans le Bassin des Dranses et Dans Quelques Regions Voisines," Bulletin de la Socie'te' Vaudoise des Sciences Naturelles, 37:241-272), which is incorporated by reference herein in its entirety. The present invention uses a different similarity measure from the Jaccard similarity measure. The present invention utilizes a similarity measure that uses min in the denominator. Using min in the denominator reduces the chance of missing similar sentences due to missing tokens, spelling variations, or misspellings. For the Jaccard similarity measure, the denominator is the union of the two sets, which could significantly lower the calculated similarity scores between two syntactically different but semantically similar sentences. Moreover, with many low-score sentences, it would also be more difficult and thus time-consuming to locate those that could be refined and converted to useful templates. A similar version of Equation 1 has been employed in entity linking research to calculate the similarity between two strings on their character level n-grams (Dezhao Song and Jeff Heflin (2011), "Automatically Generating Data Linkages Using A Domain-Independent Candidate Selection Approach," In The Semantic Web ISWC 2011 10th International Semantic Web Conference, Bonn, Germany, Oct. 23-27, 2011, Proceedings, Part I, pages 649-664), which is incorporated by reference herein in its entirety.

Corpus

The present invention identifies a set of sentence results using the original templates from a large-scale corpus. Table 5 provides the basic information of an exemplary news corpus. This large-scale corpus covers news articles of topics including finance, sports, politics, etc., and the dates of the documents in this exemplary corpus range from January 2013 to July 2014. Furthermore, this corpus may contain news documents in languages other than English. The present invention may be used to identify documents in English and may be modified to be used for bootstrapping templates for NLG systems that generate multilingual documents.

TABLE 5

News Corpus Statistics

| | |
|---|---|
| Size | 30 GB (compressed) |
| Documents | 14 Million |
| Sentences | 147 Million (distinct) |

In order to utilize a corpus such as the large-scale corpus in Table 5, in one embodiment the present invention implements the Stanford CoreNLP system described in (Manning et al. (2014), "The Stanford CoreNLP Natural Language Processing Toolkit," In Proceedings of the 52nd Annual Meeting of the Association for Computational Linguistics, ACL 2014, Jun. 22-27, 2014, Baltimore, Md., USA, System Demonstrations, pages 55-60), which is incorporated by reference herein in its entirety, to obtain all the sentences, by way of a sentence splitter, from the corpus. Because of the large number of sentences in the corpus (147 million as shown in Table 5), the present invention may implement the sentence selection component using Apache Spark in a distributed environment as described in (Zaharia et al. (2010), "Spark: Cluster Computing With Working Sets," In 2nd USENIX Workshop on Hot Topics in Cloud Computing, HotCloud'10, Boston, Mass., USA, Jun. 22, 2010), which is incorporated by reference herein in its entirety.

Sentence Refining and Manual Template Generation

The last step of the template bootstrapping approach according to the present invention is to manually refine and generate the actual templates from the retrieved candidate sentences. In many cases, the candidate sentences may not be appropriate to be used directly as templates for NLG systems. For example, the following sentence requires modification and refinement prior to being used as a template for NLG systems.

Original template:
Rising _TOPFUNDPERFORMANCE_ percent for the week, the _TOPFUND_ led the _FUNDGROUPNAME_ category for the week.

Candidate Sentence:
Soybeans was up more than 2 percent for the week, the fifth straight weekly rise and the longest rally since December, 2010.

Obtained Template after Refinement:
_TOPFUND_ was up more than _TOPFUNDPERFORMANCE_ percent for the week.

This candidate sentence may be selected based upon the similarity measure in Equation 1 and this candidate sentence was selected from an original template in the mutual fund domain. Without further refinement and modification, the candidate sentence itself may not be directly used by an NLG system. First, the candidate sentence contains redundant information that is not helpful for improving the quality of the documents generated by an NLG system. The clause starting from "the fifth straight weekly . . . " does not contain any corresponding semantic characteristics to those contained in the original sentence template. Furthermore, the original template that discusses the performance of mutual funds and the candidate sentence relates to the price of soybeans.

Additionally, although not reflected in the above example, another potential issue is partial sentences being returned in the set of candidate sentences. In some situations, the Stanford CoreNLP sentence splitter may split a sentence at an incorrect position in the sentence. Splitting at an incorrect position may cause a candidate sentence to contain a complete sentence and a half or partial sentence. To resolve these issues, candidate sentences are manually cleaned to produce useful templates for NLG systems.

In order to manually clean the candidate sentences and produce useful sentence templates, the candidate sentences are sorted descendingly by the calculated similarity score. The sorted candidate sentences are then manually processed until a suitable number of templates are obtained. The time required for manually processing candidate sentences may vary significantly based upon the original templates used in the search process. Generally, for templates that only generate a limited number of candidate sentences, the manual cleaning process may require a relatively small amount of time (e.g., less than 5 minutes). However, it may require a much longer amount of time (e.g., 20 to 30 minutes) to obtain a sufficient number of bootstrapped templates where the original templates generate a large number of candidate sentences.

The bootstrapping method may be evaluated based on two datasets: Biography and MutualFund. A pairwise comparison is performed between the following three systems: Original, GenNext and GenNextBootstrap. Original returns the human-written documents; GenNext may be the NLG system that only uses as an input the manually written templates; and GenNextBootstrap is the system described herein that bootstraps sentence templates from a small set of manually written templates to produce sentence templates that may be used in a NLG system to generate documents.

For each pair of systems, 30 documents may be generated using each system. Each generated document is judged by two annotators on Amazon Mechanical Turk to determine which system generated this document. Tables 6 and 7 below demonstrate the results of this determination.

TABLE 6

| MutualFund | First system selected | Second system selected | P Value |
|---|---|---|---|
| GenNext vs GenNextBootstrap | 60 | 60 | 1 |
| GenNext vs Original | 59 | 61 | 0.8551 |
| GenNextBootstrap vs Original | 53 | 67 | 0.2012 |

TABLE 7

| Biography | First system selected | Second system selected | P Value |
|---|---|---|---|
| GenNext vs GenNextBootstrap | 57 | 63 | 0.5839 |
| GenNext vs Original | 49 | 71 | 0.0446 |
| GenNextBootstrap vs Original | 39 | 81 | 0.0001 |

Generally, when comparing GenNext and GenNextBootstrap, the difference is not significant, though GenNextBootstrap performs better on the Biography dataset than GenNext. This suggests that using bootstrapped templates did not downgrade the quality of the generated documents.

Furthermore, Original, i.e. human written templates, is always the preferred system, when compared to GenNext and GenNextBootstrap. Although the difference is not significant for the MutualFund domain, in the Biography domain, human written documents are preferred when compared to those generated by GenNext and GenNextBootstrap with P values of 0.0446 and 0.0001 respectively.

It may take between 160 minutes and 180 minutes to retrieve the candidate sentences for the MutualFund and the Biography datasets respectively. The time for manually generating the templates from such candidate sentences (shown in step 808 in FIG. 8) may be between 216 minutes and 297 minutes for the MutualFund and the Biography domains respectively. Manually authoring the original templates for the GenNext system may take as long as 24 hours to manually write the original templates for each dataset. The present invention significantly reduces the number of the original templates needed for the system, thereby saving a significant amount of time without sacrificing much on the performance.

Additionally, candidate sentences that are generated by original templates that comprise complex semantic characteristics may also require a relatively long manual cleaning process. This is because it may take additional time to find the appropriate candidate sentences from the set of sentence results that comprise the same or similar semantic characteristics as those in the original templates.

The embodiments described above and in the claims are intended only to illustrate and teach one or more ways of practicing or implementing the present invention, not to restrict its breadth or scope. For example, FIG. 1 shows browser 1383 and display 1381 as having the ability to display simultaneously; however, in operation, some embodiments may present them at separate times.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer implemented method comprising:
a) receiving by a computer comprising a processor and a memory a set of original templates and storing the set of original templates in the memory;
b) accessing by a computer a set of databases comprising a large corpus of documents and searching by a search engine the set of databases based on the set of original templates;
c) identifying by the search engine a set of candidate sentences from a set of documents in the corpus by using a similarity measure to determine a similarity score, wherein the similarity measure comprises extracting a first set of tokens from at least one template from the set of original templates and extracting a second set of tokens from at least one candidate sentence from the set of candidate sentences, the first set of tokens and the second set of tokens each comprising a set of token-level 1 to token-level n grams, and further comprises comparing the extracted first set of tokens with the extracted second set of tokens by determining a first value representing an intersection of the extracted first and second sets of tokens, and dividing that first value by a second value derived by applying a minimum function to the extracted first and second sets of tokens to determine the similarity score;
d) automatically eliminating candidate sentences from the set of candidate sentences based upon a similarity score threshold to arrive at a reduced set of candidate sentences determined to be syntactically similar to the at least one template; and
e) processing the reduced set of candidate sentences to generate a set of natural language generation templates that, when processed by a computer and combined with a set of determined words or phrases, generate natural language text.

2. The method of claim 1 further comprising sorting the set of candidate sentences based on the similarity score.

3. The method of claim 1 further comprising identifying all sentences in the corpus by splitting each sentence from each other sentence for every document in the corpus.

4. The method of claim 1 further comprising wherein the similarity measure comprises the formula:

$$\frac{|\text{gram\_set}(n, s1) \cap \text{gram\_set}(n, s2)|}{\min(|\text{gram\_set}(n, s1)|, |\text{gram\_set}(n, s2)|)} > \theta$$

wherein s1 represents a first sentence and s2 represents a second sentence and wherein gram_set(n, s1) and gram_set(n, s2) each extract the token level 1 to n-grams from a sentence.

5. The method of claim 1 wherein the identifying further comprises identifying a set of syntactically similar sentences that are not identical to any template in the set of original templates and that comprise a set of semantic characteristics similar to the set of original templates.

6. The method of claim 1 further comprising determining if the similarity score for a sentence and a template from the set of original templates is higher than a determined threshold and placing the sentence in the set of candidate sentences.

7. The method of claim 1 wherein the identifying further comprises identifying a set of candidate sentences that relate to a topic similar to a topic associated with the set of original templates.

8. The method of claim 1 further comprising wherein the set of original templates are manually generated for a domain.

9. The method of claim 1 further comprising wherein the large corpus of documents is a news corpus.

10. The method of claim 1 further comprising generating by a computer a set of natural language sentences based on the set of natural language templates.

11. A system for bootstrapping a set of templates for generating natural language sentences, the system comprising:
   a) at least one database comprising a corpus of documents;
   b) a computer comprising a processor and a memory, the memory containing a set of executable code executable by the processor;
   c) a search controller configured to receive a set of original templates and generate a query based on the set of original templates;
   d) a search engine adapted to receive the query from the search controller and search the corpus of documents using the query based on the set of original templates to identify a set of candidate sentences from the corpus of documents;
   e) a template analyzer adapted to:
      i) select a set of similar sentences from the identified set of candidate sentences by using a similarity measure to determine a similarity score for each selected sentence, wherein the similarity measure comprises extracting a first set of tokens from at least one template from the set of original templates and extracting a second set of tokens from at least one candidate sentence from the set of candidate sentences, the first set of tokens and the second set of tokens each comprising a set of token-level 1 to token-level n grams, and further comprises comparing the extracted first set of tokens with the extracted second set of tokens by determining a first value representing an intersection of the extracted first and second sets of tokens, and dividing that first value by a second value derived by applying a minimum function to the extracted first and second sets of tokens to determine the similarity score;
      ii) automatically eliminate candidate sentences from the set of candidate sentences based upon a similarity score threshold to arrive at a reduced set of candidate sentences determined to be syntactically similar to the at least one template; and
      iii) generate a set of natural language generation templates based at least in part on the similarity scores that, when processed by a computer and combined with a set of determined words or phrases, generate natural language text.

12. The system of claim 11 wherein the template analyzer is further adapted to sort the set of candidate sentences based on the similarity score.

13. The system of claim 11 wherein the template analyzer is further adapted to identify all sentences in the corpus by splitting each sentence from each other sentence for every document in the corpus.

14. The system of claim 11 wherein the similarity measure comprises the formula:

$$\frac{|\text{gram\_set}(n, s1) \cap \text{gram\_set}(n, s2)|}{\min(|\text{gram\_set}(n, s1)|, |\text{gram\_set}(n, s2)|)} > \theta$$

wherein s1 represents a first sentence and s2 represents a second sentence and wherein gram_set(n, s1) and gram_set(n, s2) each extract the token level 1 to n-grams from a sentence.

15. The system of claim 11 wherein the search engine is further adapted to identify a set of syntactically similar sentences that are not identical to any template in the set of original templates and that comprise a set of semantic characteristics similar to the set of original templates.

16. The system of claim 11 wherein the template analyzer is further adapted to determine if the similarity score for a sentence and a template from the set of original templates is higher than a determined threshold and to place the sentence in the set of candidate sentences.

17. The system of claim 11 wherein the template analyzer is adapted to identify a set of candidate sentences that relate to a topic similar to a topic associated with the set of original templates.

18. The system of claim 11 further comprising wherein the set of original templates are manually generated for a domain.

19. The system of claim 11 further comprising wherein the large corpus of documents is a news corpus.

20. The system of claim 11 wherein the template analyzer is further adapted to generate a set of natural language sentences based on the set of natural language templates.

* * * * *